United States Patent
Jeng

(10) Patent No.: US 12,060,840 B2
(45) Date of Patent: Aug. 13, 2024

(54) TURBINE ENGINE SYSTEM

(71) Applicant: HELENG INC., Temple City, CA (US)

(72) Inventor: Jack Ing Jeng, Arcadia, CA (US)

(73) Assignee: HELENG INC., Temple City, CA (US)

( * ) Notice: Subject to any disclaimer, the term of this patent is extended or adjusted under 35 U.S.C. 154(b) by 0 days.

(21) Appl. No.: 18/055,723

(22) Filed: Nov. 15, 2022

(65) Prior Publication Data

US 2023/0075469 A1   Mar. 9, 2023

Related U.S. Application Data

(63) Continuation-in-part of application No. 17/302,530, filed on May 5, 2021, now abandoned, which is a continuation of application No. 17/067,143, filed on Oct. 9, 2020, now Pat. No. 11,035,298.

(60) Provisional application No. 62/990,181, filed on Mar. 16, 2020.

(51) Int. Cl.
| | |
|---|---|
| *F02C 9/26* | (2006.01) |
| *F01D 1/02* | (2006.01) |
| *F01D 17/02* | (2006.01) |
| *F01D 19/00* | (2006.01) |
| *F02C 7/22* | (2006.01) |
| *F02C 7/266* | (2006.01) |

(52) U.S. Cl.
CPC ............... *F02C 9/26* (2013.01); *F01D 1/026* (2013.01); *F01D 17/02* (2013.01); *F01D 19/00* (2013.01); *F02C 7/22* (2013.01); *F02C 7/266* (2013.01)

(58) Field of Classification Search
CPC . F01D 1/026; F01D 5/141; F01D 7/00; F01D 17/00; F01D 17/02; F02C 7/22; F02C 9/16; F02C 9/26
See application file for complete search history.

(56) References Cited

U.S. PATENT DOCUMENTS

| | | |
|---|---|---|
| 2,013,087 A | 9/1935 | Cornell |
| 2,304,136 A | 12/1942 | Woods |
| 6,798,080 B1 | 9/2004 | Baarman et al. |
| (Continued) | | |

FOREIGN PATENT DOCUMENTS

| | | |
|---|---|---|
| DE | 3937910 A1 | 5/1991 |
| KR | 101757600 B1 | 7/2017 |
| WO | 2013068977 A1 | 5/2013 |

OTHER PUBLICATIONS

International Search Report dated Apr. 28, 2021 for PCT Patent Application No. PCT/IB2021/050567.

(Continued)

*Primary Examiner* — Arun Goyal
(74) *Attorney, Agent, or Firm* — MLO, a professional corp.

(57) ABSTRACT

Disclosed is a system including a turbine having a plurality of blades being spaced circumferentially around a shaft. A plurality of dispensers is included. Each dispenser of the plurality of dispensers is positioned facing the open surface of the plurality of blades and directs discharged fluid toward the open surface of the plurality of blades to drive the turbine. A housing encloses the plurality of blades and a portion of each dispenser. A plurality of exhaust pipes is coupled to the housing and extends away from the shaft directing the discharged fluid out of the housing. Each exhaust pipe corresponds to a respective dispenser of the plurality of dispensers. A controller is in communication with the plurality of dispensers and is configured to control the plurality of dispensers.

9 Claims, 31 Drawing Sheets

(56) References Cited

U.S. PATENT DOCUMENTS

| | | |
|---|---|---|
| 2007/0151227 A1 | 7/2007 | Worrell et al. |
| 2011/0033291 A1 | 2/2011 | Moore et al. |
| 2011/0194936 A1 | 8/2011 | Bender |
| 2017/0089216 A1 | 3/2017 | Cui et al. |
| 2018/0023410 A1 | 1/2018 | Lee |

OTHER PUBLICATIONS

Notice of Allowance dated Feb. 3, 2021 for U.S. Appl. No. 17/067,143.
Office Action dated Jan. 6, 2021 for U.S. Appl. No. 17/067,143.
Office Action dated May 6, 2024 for China Patent Application No. 202110280232.7.

TURBINE ENGINE SYSTEM

RELATED APPLICATIONS

This application is a is a continuation-in-part of U.S. patent application Ser. No. 17/302,530 filed May 5, 2021 and entitled "Turbine Engine System," which is a continuation of U.S. patent application Ser. No. 17/067,143 filed Oct. 9, 2020 and entitled "Turbine Engine System," which claims priority to U.S. Provisional Patent Application No. 62/990,181 filed on Mar. 16, 2020 and entitled "Turbine Engine System," all of which are hereby incorporated by reference for all purposes.

BACKGROUND

Power sources for producing power have evolved over time. Each design has trade-offs for managing power generation, thermal efficiency, energy efficiency, emission controls, pollution production, noise generation, resources consumed during operation, cost and aesthetics. For example, a typical piston-based combustion engine in a vehicle uses about 20-35% of the energy released by the fuel to move the vehicle due to energy losses such as friction, noise, air turbulence, and the work used to rotate engine components and other appliances. In another example, fossil fuel power plants burn fossil fuels, such as coal or natural gas, to produce electricity, and machinery converts the heat energy into mechanical energy which operates a generator. The power plant uses the energy extracted from expanding gas such as steam or combusted gas. The conversion methods have limited efficiency and produce unused heat and emissions such as $CO_2$, $SO_2$, NOx, and particulate matter. There are additional energy losses during the transmittal and distribution of the electricity.

SUMMARY

Disclosed is a system including a turbine having a plurality of blades being spaced circumferentially around a shaft. Each blade of the plurality of blades is a hemispherical-shaped cup with an open surface. A plurality of dispensers is included, and each dispenser of the plurality of dispensers is positioned facing the open surface of the each blade, and directs discharged fluid toward the open surface of the each blade to drive the turbine. A housing encloses the plurality of blades and a portion of each dispenser of the plurality of dispensers, and has an exhaust pipe extending away from the shaft directing the discharged fluid out of the housing. A controller is in communication with the plurality of dispensers, and controls the plurality of dispensers.

Disclosed is a system including a turbine having a plurality of blades being spaced circumferentially around a shaft. Each blade of the plurality of blades is a hemispherical-shaped cup with an open surface. A dispenser is positioned facing the open surface of a blade, and directs discharged fluid toward the open surface of the blade to drive the turbine. A housing encloses the plurality of blades and a portion of each dispenser of the plurality of dispensers, and has an exhaust pipe extending away from the shaft directing the discharged fluid out of the housing. A controller is in communication with the dispenser and controls the dispenser by determining a time for the dispenser to dispense air and fuel into a combustion chamber based on the position of the blade, an amount of the air and an amount of the fuel for the dispenser to dispense into the combustion chamber based on the position of the blade, and a time for an ignitor to spark an igniting of an air-fuel mixture to cause combustion in the combustion chamber based on the position of the blade.

Disclosed is a system including a turbine having a plurality of blades being spaced circumferentially around a shaft. Each blade of the plurality of blades is a hemispherical-shaped cup with an open surface. A plurality of dispensers is included. Each dispenser of the plurality of dispensers is positioned facing the open surface of the plurality of blades and directs discharged fluid toward the open surface of the plurality of blades to drive the turbine. A housing encloses the plurality of blades and a portion of each dispenser of the plurality of dispensers. A plurality of exhaust pipes is coupled to the housing and extends away from the shaft directing the discharged fluid out of the housing. Each exhaust pipe of the plurality of exhaust pipes corresponds to a respective dispenser of the plurality of dispensers. A controller is in communication with the plurality of dispensers and is configured to control the plurality of dispensers.

Disclosed is a system including a turbine having a plurality of blades being spaced circumferentially around a shaft. A plurality of dispensers is positioned facing the plurality of blades and directs discharged fluid toward the plurality of blades to drive the turbine. Each dispenser of the plurality of dispensers includes a combustion chamber having a funnel shape with a top surface and a bottom surface. A nozzle has a first nozzle end coupled to the bottom surface of the combustion chamber and a second nozzle end positioned to direct the discharged fluid after combustion in the combustion chamber toward the open surface of the plurality of blades driving the turbine. A plurality of exhaust pipes extends away from the shaft directing the discharged fluid away from the shaft. Each exhaust pipe of the plurality of exhaust pipes corresponds to a respective dispenser of the plurality of dispensers. A controller in communication with the plurality of dispensers is configured to control the plurality of dispensers.

DETAILED DESCRIPTION

Disclosed is a turbine engine system that generates power by using an internal combustion engine design combined with rocket combustion theory. The system includes a turbine having a plurality of spokes and each spoke has a blade which may be a hemispherical-shaped cup with an open surface, and a plurality of dispensers. Each dispenser includes a combustion chamber where air and fuel are ignited then fluid, such as gas, is discharged out of the combustion chamber toward the blade of the turbine to move the turbine thus generating power. The turbine engine system may be coupled to other components such as a motor, generator, wheel, propeller or transmission system depending on the application. The turbine engine system may replace conventional power sources and provide power for various types of transportation devices such as a passenger vehicle, train, ship or aircraft. The size of the turbine engine system can be customized depending on the application. A plurality of turbine engine systems can be coupled to the same shaft for additional power generation, or the turbine engine system can be coupled to another power generator or a plurality of generators to generate a greater amount of power.

It is known in the art that some traditional power generation systems have efficiencies of only 20-30%. The turbine engine system improves the efficiency of the system up to 95% compared to traditional power generation systems. The turbine engine system reduces or eliminates complicated, heavy drivetrains, transmissions and other components of traditional power generation systems, and the turbine engine system has less components, a smaller footprint, weighs less, produces less emissions and is quieter than traditional power generation systems. The turbine engine system is designed to replace piston-based engines used in vehicles such as cars, trucks, trains, boats, ships and aircrafts by directly engaging to the drivetrain of the vehicle, the propeller and the alternator or generator. The turbine engine system can be implemented and configured at 0° to 90° for use in vertical take-off and landing aircrafts or ship propulsion steering systems, and can replace air independent propulsion engines for submarines.

In some embodiments, the turbine engine system may be implemented as a generator for home use or in a large capacity power plant/farm to generate a high volume of electricity. Using the turbine engine system as a power plant/farm eliminates the need for costly components such as transmission lines, poles, towers, transformers, switches, relays, and power distribution hubs. The energy distribution can be based on demand hence saving fossil fuel consumption while producing less pollution. This results in reducing the consumer electric bill significantly.

Figure 1A:
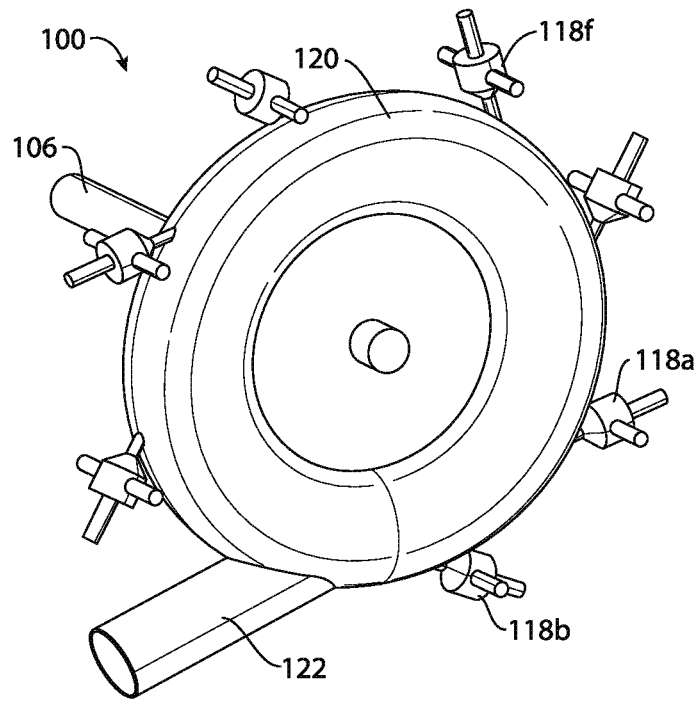
FIGS. 1A and 1B are perspective views of a turbine engine system, in accordance with some embodiments.
Figure 1B:
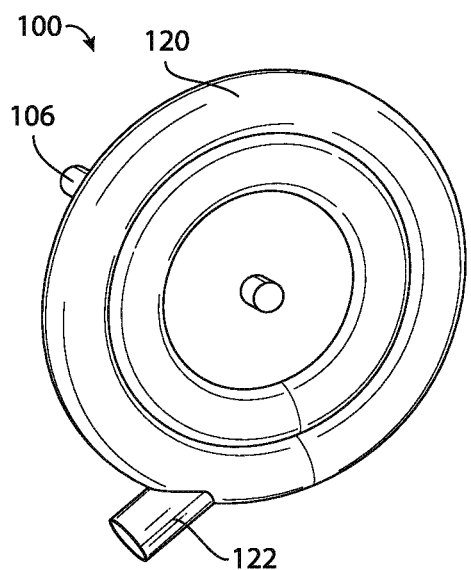
Figure 2:
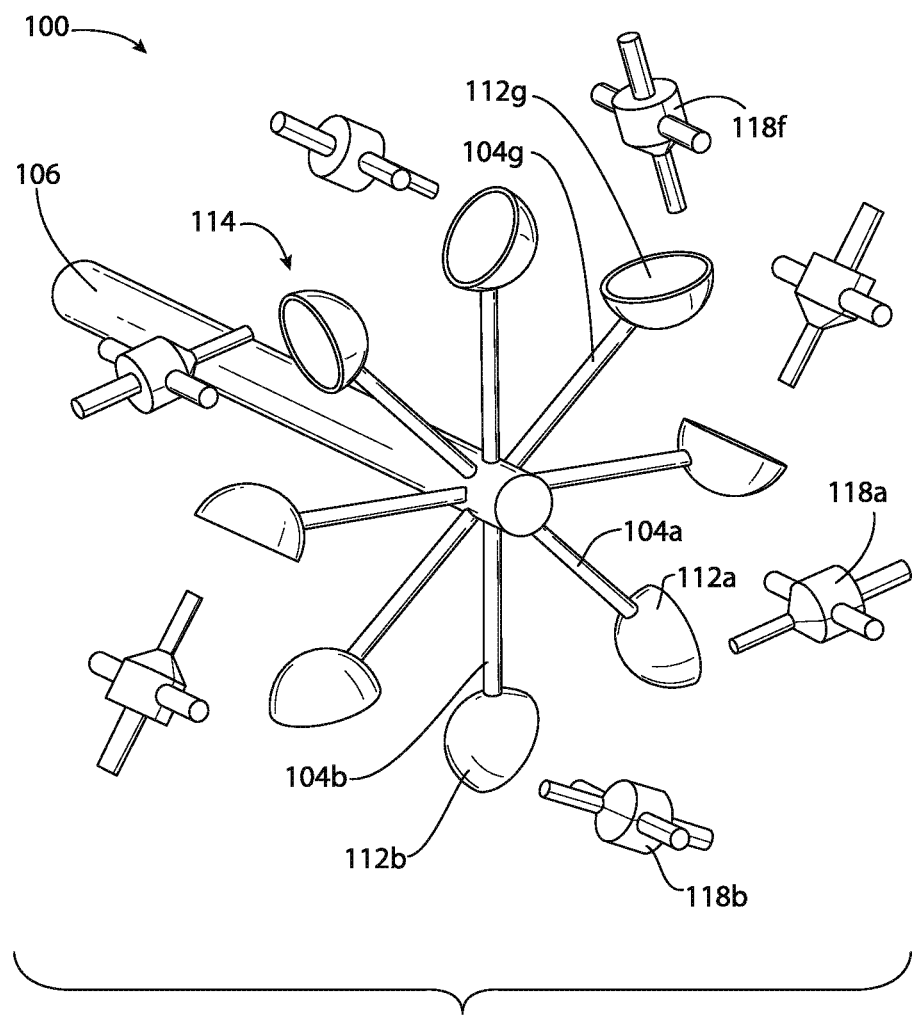
FIG. 2 is a perspective view of the turbine engine system with the housing removed.
Figure 3:
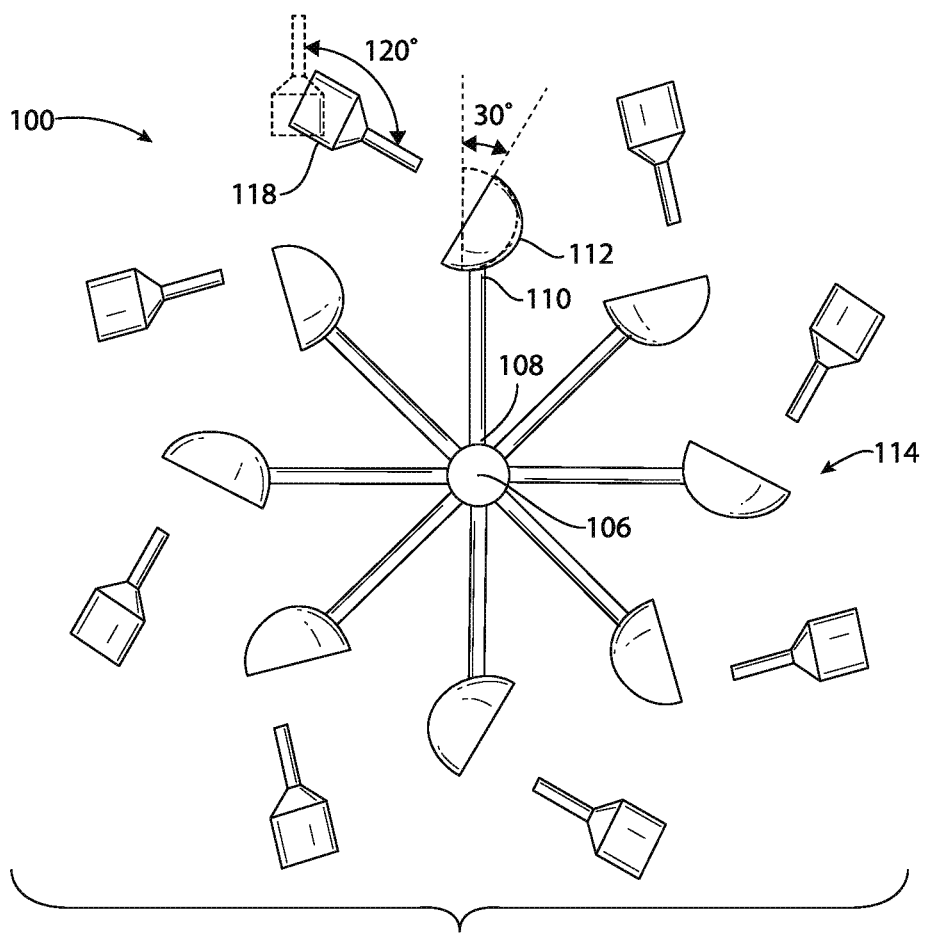
FIG. 3 is a front view of plurality of spokes of the turbine, in accordance with some embodiments.

FIG. 1A is a perspective view of a turbine engine system 100, in accordance with some embodiments, FIG. 1B is a perspective view of a turbine engine system 100, in accordance with some embodiments, and FIG. 2 is a perspective view of the turbine engine system 100 with the housing removed, such as FIG. 1A or FIG. 1B with the housing removed. The turbine engine system 100 has a plurality of spokes 104. Each of the plurality of spokes 104 may be designated as 104a, 104b, 104c . . . 104n. As shown, there are eight spokes 104 which is considered an 8-blade turbine design. The plurality of spokes 104 are spaced circumferentially around a shaft 106. The spacing of each of the plurality of spokes 104 may be evenly spaced, or spaced in a pattern such as spaced in pairs with more distance in between the pairs, or randomly spaced, or the like. In FIG. 3, each of the plurality of spokes 104 has a first spoke end 108 and a second spoke end 110, and the spoke 104 extends along an axis between the first spoke end 108 and the second spoke end 110. The first spoke end 108 is coupled to the shaft 106 and the second spoke end 110 is coupled to a blade 112 of a plurality of blades 112. Each of the plurality of blades 112 may be designated as 112a, 112b, 112c . . . 112n. Each of the plurality of blades 112 has a receiving face with an open surface such as a hollowed-out receptacle to catch and receive fluid. In some embodiments, each of the plurality of blades 112 is a hemispherical-shaped cup with an open surface. Other shapes are possible such as oval or elliptical. The shape of each of the plurality of blades 112 is designed to maximize the amount of fluid collected while considering drag coefficient in fluid dynamic theory. For example, the hemispherical-shaped cup blade 112 may have a drag coefficient of 0.42 and a blade 112 with an elliptical shape may have a drag coefficient of 0.04. The depth of the hemispherical-shaped cup with an open surface may be completely hollowed-out or may not be hollowed-out but only slightly concaved. The plurality of spokes 104 and the plurality of blades 112 are configured to rotate about the shaft 106 forming a turbine 114.

A plurality of dispensers 118 are mounted to the housing 120 and spaced circumferentially around the shaft 106. The spacing of each of the plurality of dispensers 118 may be evenly spaced, or spaced in a pattern such as spaced in pairs with more distance in between the pairs, or randomly spaced, or the like. Generally, the spacing of each of the plurality of dispensers 118 coordinates with the spacing of each of the plurality of spokes 104. Each of the plurality of dispensers 118 may be designated as 118a, 118b, 118c . . . 118n. Each of the plurality of dispensers 118 is configured to deliver fluid (e.g., liquid or gas) to each of the plurality of blades 112. Each of the plurality of dispensers 118 is generally positioned facing the open surface of each of the plurality of blades 112, and configured to direct discharged fluid toward the open surface of each of the plurality of blades 112 to drive or move the turbine 114.

Referring to FIG. 1A, a housing 120 encloses a portion of each of the plurality of dispensers 118, the plurality of blades 112, the plurality of spokes 104 and a portion of the shaft 106. Referring to FIG. 1B, in some embodiments, the housing 120 encloses all of the plurality of dispensers 118, the plurality of blades 112, the plurality of spokes 104 and a portion of the shaft 106. In this way, all of the plurality of dispensers 118 are located inside of the housing 120. This may be a one or two-piece design such that a first portion of the housing 120 encloses a portion of each of the plurality of dispensers 118, the plurality of blades 112, the plurality of spokes 104 and a portion of the shaft 106, and a second portion of the housing 120 encloses all of the plurality of dispensers 118, the plurality of blades 112, the plurality of spokes 104 and a portion of the shaft 106.

The housing 120 may be circular or toroidal or another suitable shape. In some embodiments, liquid coolant conduits (shown in FIG. 14) are coupled to the inside surface of the housing 120 and configured to dissipate heat in the discharged fluid after combustion in the combustion chamber 124 of each of the plurality of dispensers 118. An exhaust pipe 122 may be coupled to or integral with the housing 120, and may extend away from the shaft 106. The exhaust pipe 122 is configured to direct the discharged fluid out of the housing 120. The exhaust pipe 122 may include a muffler or a silencer system such as in firearm technology to reduce noise.

FIG. 3 is a front view of a plurality of spokes 104 of the turbine engine system 100, in accordance with some embodiments. Each of the plurality of blades 112 is coupled to the second spoke end 110 of each of the plurality of spokes 104 with the open surface at an angle to the axis (along the spoke 104, see dashed line). FIG. 3 shows each of the plurality of blades 112 at a 30° angle to each of the plurality of spokes 104. In this way, each of the plurality of blades 112 is apt to maximize the amount of fluid such as combusted gas received from each of the plurality of dispensers 118 depending on the application. In other embodiments, each of the plurality of blades 112 is at an angle to the spoke of −20° to 75° such as −15°, 0°, 15°, 20°, 30°, 40° or 60°. In some embodiments, each of the plurality of dispensers 118 may be positioned at a 120° angle to each of the plurality of spokes 104. The centerline of each of the plurality of dispensers 118 may be perpendicular to a portion of each of the plurality of blades 112 such as the receiving face of the open surface of the cup of each of the plurality of blades 112. The position of each of the plurality of dispensers 118 is designed to maximize the amount of fluid collected by each of the plurality of blades 112.

Figure 4A:
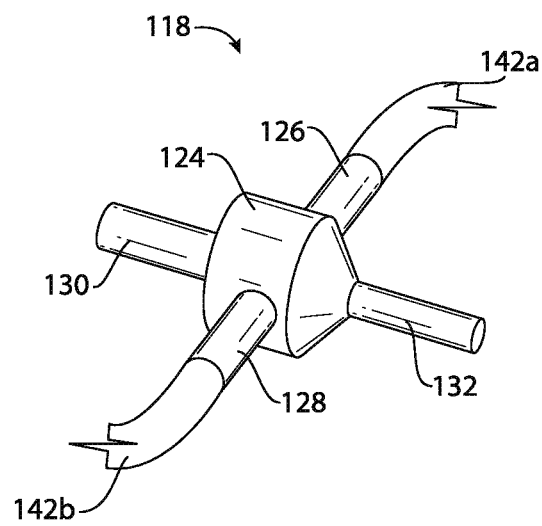
FIG. 4A is a perspective view of the dispenser of the turbine engine system, in accordance with some embodiments.

FIG. 4A is a perspective view of the dispenser 118 of the turbine engine system 100, in accordance with some embodiments. The design of the plurality of dispensers 118 is based on rocket combustion design technology. Conventionally, a piston engine only harvests the initial energy per ignition because when the piston stroke reaches the end, no more energy can be used to turn the shaft. Thus, a large percentage of the energy is lost in the impact of the stroke. Conversely, the turbine engine system 100 can harvest nearly 100% of the gas expansion energy because the turbine is in continuous rotation. Each of the plurality of dispensers 118 includes a combustion chamber 124 which may be a conical shape with a first, wider-shaped end and a second, narrower-shaped end such as a funnel. Other shapes are possible. An air injector 126 is coupled to the combustion chamber 124 and configured to inject air of an air-fuel mixture into the combustion chamber 124. A fuel injector 128 is coupled to the combustion chamber 124 and configured to inject fuel of the air-fuel mixture into the combustion chamber 124. An ignitor 130 such as a spark plug is coupled to the combustion chamber 124 and configured to supply an electrical spark for combustion of the air-fuel mixture in the combustion chamber 124. A nozzle 132 has a first nozzle end coupled to the combustion chamber and a second nozzle end positioned to direct the discharged fluid after combustion in the combustion chamber 124 toward the open surface of the blade 112 to move the turbine engine system 100. The shape of the nozzle may be linear as shown in FIG. 4A, or curved. The fuel injector 128 of the dispenser 118 injects the fuel into the combustion chamber 124 via hose 142b, and the air injector 126 of the dispenser 118 injects the air into the combustion chamber 124 via hose 142a.

The turbine engine system 100 is a nearly frictionless turbine with a rocket-based internal combustion engine. For example, the turbine engine system 100 may use a ball bearing between the stator and the rotator, and the coefficient of friction of the ball bearing may be 0.1 to 0.001. Reducing friction in the balls bearings reduces wear and facilitates extended use at high speeds. Additionally, reducing friction reduces the risk of overheating and premature failure of the ball bearing. These factors directly impact efficiency.

In some embodiments, the fuel is gasoline or liquified natural gas. For example, when gasoline is used, a 1.0 L piston-based combustion engine requires about 0.1 ml of gasoline mixed with an adequate volume of air or oxygen per explosion. The ratio of gasoline to air may be 14.7:1 by mass (weight). After the ignition by, for example, the spark plug, the gasoline and air mixture explodes and generates up to 1,500° C. of heat. According to thermal expansion and gas laws, for every 100° C. incremental, the gas volume expands by 33%, so at 1500° C., the hot air volume increase 51.2 times such as $1.3^{15}=51.186$. In other words, for every 0.1 ml of gasoline exploded, there is 46.5 L or 0.1×0.755 (gasoline weight)×14.7×51.2/1.225 (air density)=46.4873 L gas volume at normal temperature. In the present embodiments, the nozzle 132 coupled to the combustion chamber 124 directs the hot air—or discharged fluid—after combustion in the combustion chamber 124 toward the open surface of each of the plurality of blades 112 to drive the turbine 114 of the turbine engine system 100. The discharged fluid exits the combustion chamber 124 at a high speed similar to a fire engine dispensing high-pressure water. The discharged fluid contacts and pushes or moves each of the plurality of blades 112 of the turbine 114 and causes each of the plurality of blades 112 to rotate about the shaft 106.

Figure 4B:
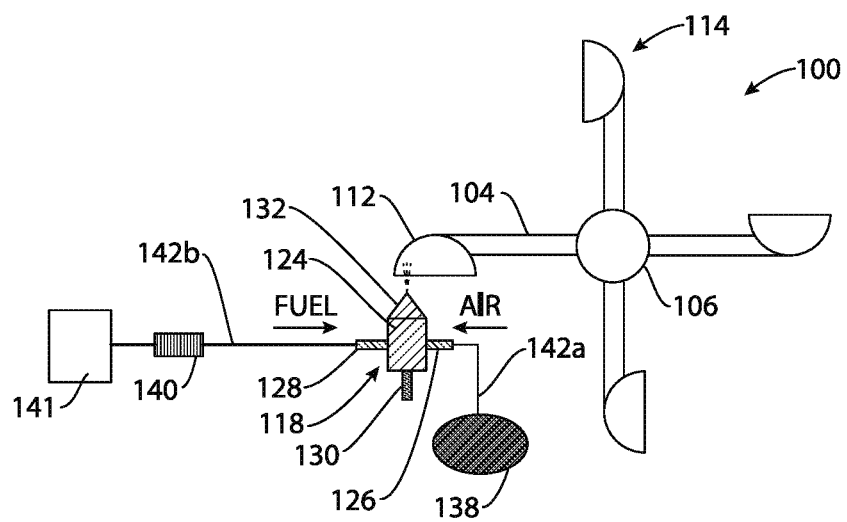
FIGS. 4B and 4C are example block diagrams of the turbine engine system, in accordance with some embodiments.

FIG. 4B is an example block diagram of the turbine engine system 100, in accordance with some embodiments. The turbine engine system 100 also includes an air compressor 138 and a fuel pump 140 coupled to a fuel tank 141. The air compressor 138 and the fuel pump 140 are coupled to each of the plurality of dispensers 118 respectively by, for example, hoses 142 such as high-pressure hoses. The air compressor 138 is configured to deliver air to the air injector 126 of the dispenser 118 and into the combustion chamber 124 via hose 142a. The fuel pump 140 is configured to deliver fuel to the fuel injector 128 of the dispenser 118 and into the combustion chamber 124 via hose 142b. The air compressor 138 and fuel pump 140 are mounted outside of the housing 120.

Figure 4C:
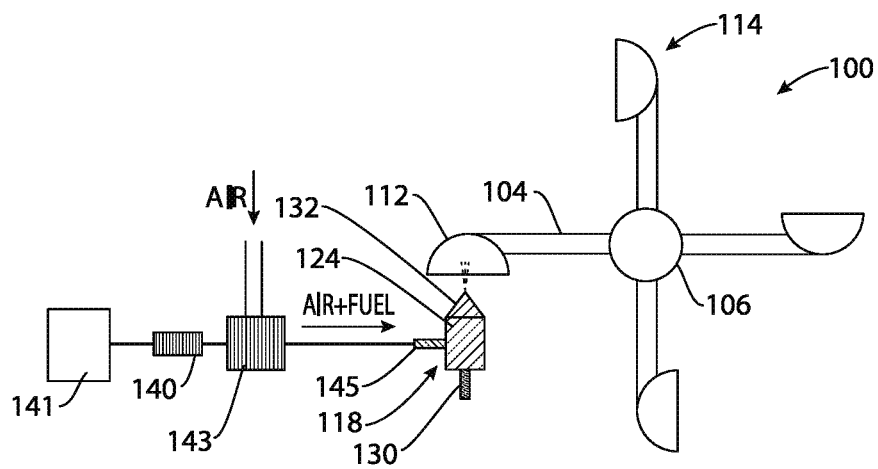

FIG. 4C is an example block diagram of the turbine engine system 100, in accordance with some embodiments. In some embodiments, there is a carburetor 143 instead of the air injector 126 and air compressor 138. In this way, fuel from the fuel pump 140 and ambient air enter into the carburetor 143 and are mixed together with the ratio of fuel to air of 14.7:1. This air-fuel mixture then enters the dispenser 118 via a valve 145 so that the valve 145 regulates the flow of the air-fuel from the carburetor 143 to the combustion chamber 124 of the dispenser 118. The ignitor 130 provides the spark to explode the air-fuel mixture in the combustion chamber 124 and the nozzle 132 directs the gas (from the exploded air-fuel mixture) toward the open surface of each of the plurality of blades 112. The speed and pressure of the gas causes each of the plurality of blades 112 to rotate about the shaft 106 to drive the turbine 114 of the turbine engine system 100.

Figure 5:
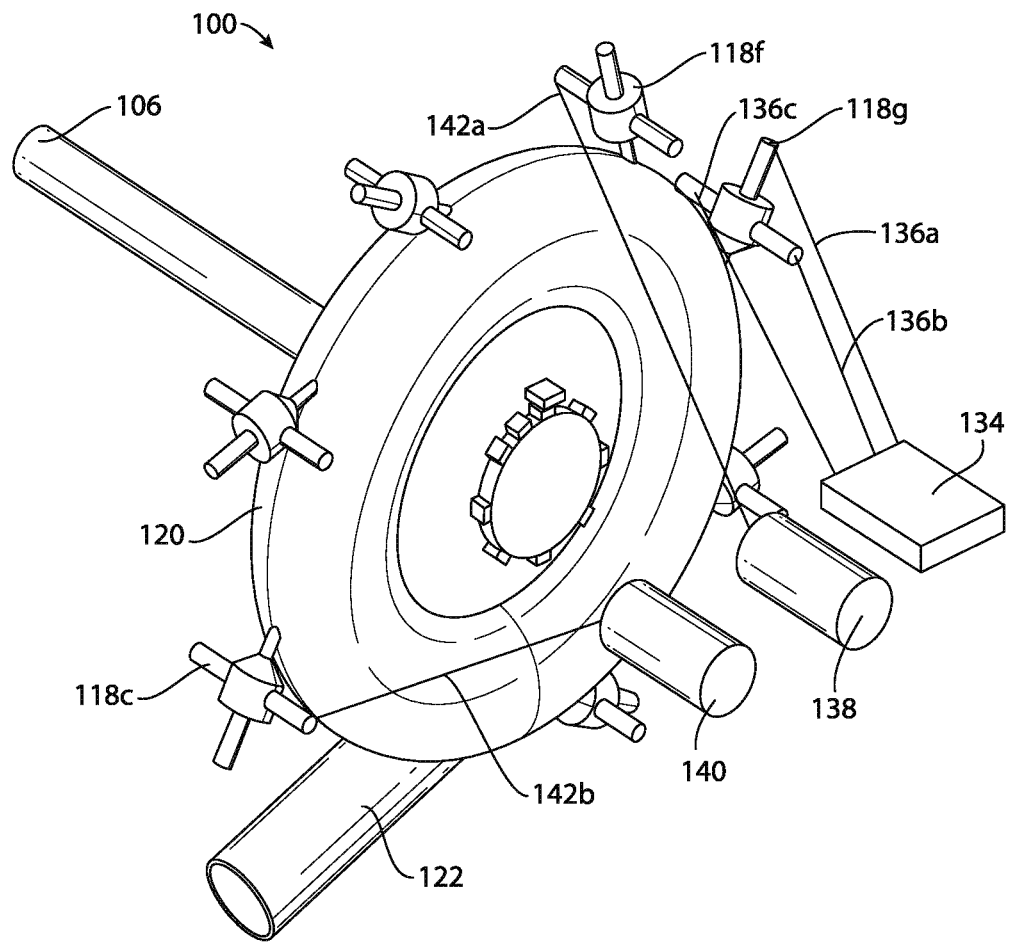
FIG. 5 is a perspective view of the turbine engine system, in accordance with some embodiments.

FIG. 5 is a perspective view of the turbine engine system 100, in accordance with some embodiments. A controller 134 is in communication with the plurality of dispensers 118 and configured to control at least the air injector 126, the fuel injector 128 and the ignitor 130 of each of the plurality of dispensers 118. In some embodiments, the controller 134 is in communication with the valve 145 and configured to control the valve 145. The controller 134 may be coupled to the air injector 126 and the fuel injector 128 to control the opening and closing of an internal air valve in each air injector 126 and an internal fuel valve in each fuel injector 128. The controller 134 may also be coupled to the ignitor 130 with wires to control the ignition in each of the plurality of dispensers 118. For simplicity, in FIG. 5, the wires are shown as 136a, 136b and 136c from the controller 134 to only one of the dispensers 118 such as 118g. For example, wire 136a is between the controller 134 and ignitor 130, wire 136b is between the controller 134 and fuel injector 128 and wire 136c is between the controller 134 to air injector 126. The hoses, 142a and 142b, are shown to only one of the dispensers 118 such as 118f and 118b. The fuel injector 128 of the dispenser 118 injects the fuel into the combustion chamber 124 via hose 142b and communicates via wire 136b. The air injector 126 of the dispenser 118 injects the air into the combustion chamber 124 via hose 142a and communicates via wire 136c.

Figure 6:
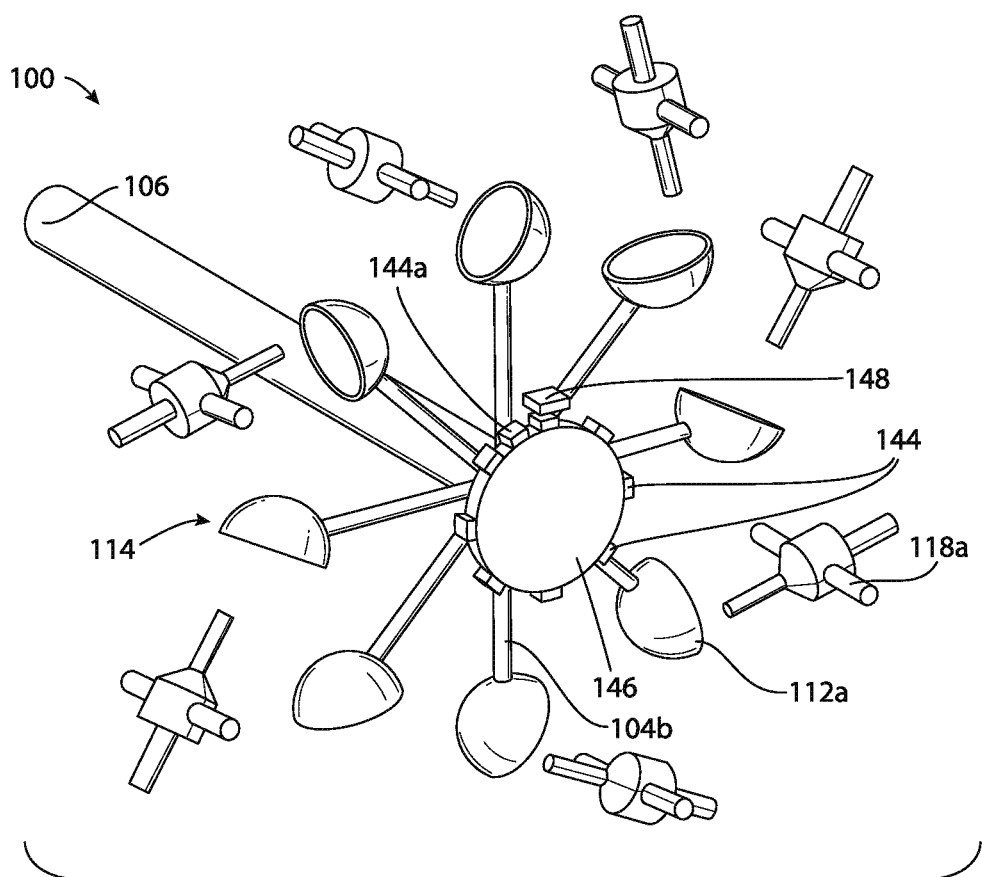
FIG. 6 is a perspective view of the turbine engine system with the housing removed, in accordance with some embodiments.

FIG. 6 is a perspective view of the turbine engine system 100 with the housing 120 removed, in accordance with some embodiments. In some embodiments, the turbine engine system 100 further includes a plurality of magnets 144 for monitoring the position and rotation of the plurality of spokes 104, the plurality of blades 112, and the speed of the turbine engine system 100. Each of the plurality of magnets 144 may be associated with each of the plurality of spokes 104, or each of the plurality of blades 112. Each of the plurality of magnets 144 may be positioned on each of the plurality of spokes 104, or each of the plurality of blades 112, or on a disk 146 configured to rotate or a combination thereof.

In some embodiments, a sensor 148 such as a Hall effect sensor is in a fixed position relative to the rotating plurality of spokes 104, plurality of blades 112, and disk 146 so that the plurality of magnets 144 move past the sensor 148. The sensor 148 is in communication with the controller 134. When the magnets rotate past, for example, the Hall effect sensor 148, an electromagnetic signal is generated. These synchronous bits are used to indicate the position of each of the plurality of blades 112. A reference magnet 144a not associated with a particular spoke 104 or blade 112 may be used to determine an original, first position of the plurality of blades 112 of the turbine 114. The controller 134 receives a signal from the sensor indicating the original, first position of each of the plurality of blades 112 and subsequent positions of each of the plurality of blades 112 when the turbine 114 is moving. The controller 134 uses the original, first position of the plurality of blades 112 and determines the amount and timing of the air and the fuel to dispense, the timing of the spark for ignition, the amount of air flow from the air compressor 127 (as described with reference to FIGS. 9A-9C, 10A-10B, and 11A-11D) and the frequency of the combustion cycle. In some embodiments, other methods for measuring rotational speed could be used including shaft encoders, photoelectric sensors or optical detection.

During operation of the turbine engine system 100, the controller 134 receives at least a position of one blade 112 and determines data for operating each of the plurality of dispensers 118. The position of each of the plurality of blades 112 may be relative to each of the plurality of dispensers 118 such as an angular orientation of each of the plurality of blades 112 relative to each of the plurality of dispensers 118. Or, the position of the blades 112 may be relative to each of the plurality of spokes 104 such as an angular orientation of each of the plurality of blades 112 relative to each of the plurality of spokes 104.

The data includes a time (e.g., moment and duration) for each of the plurality of dispensers 118 to dispense the air, and a time (e.g., moment and duration) for each of the plurality of dispensers 118 to dispense the fuel into the combustion chamber 124 based on the position of at least one blade of the plurality of blades 112. The data also includes an amount of the air and an amount of the fuel for each of the plurality of dispensers 118 to dispense into the combustion chamber 124 based on the position of at least one blade of the plurality of blades 112. The data further includes a time for the ignitor 130 to spark the igniting of the air-fuel mixture to cause combustion in the combustion chamber 124 based on the position of at least one blade of the plurality of blades 112. Based on the data, the controller 134 controls the air injector 126, the fuel injector 128 and the ignitor 130. The speed of the turbine engine system 100 may also be controlled. For example, the controller 134 may determine a speed of the turbine engine system 100 from the readings by the Hall effect sensor 148, and can increase or decrease the amount of air-fuel or adjust the timing (e.g., moment and duration) to increase or decrease the speed. A typical piston engine may run at 6,000 rpm or 100 revolutions per second while each ignition of the piston-cylinder (explosion) takes about 2 milliseconds. The turbine engine system 100 uses less gasoline to produce the same power.

In some embodiments, for example, such as when a carburetor 143 is used, the data includes a time to dispense the air-fuel mixture into the combustion chamber 124 of each of the plurality of dispensers 118 via the valve 145 based on the position of at least one blade of the plurality of blades 112. The data also includes an amount of the air-fuel mixture to dispense into the combustion chamber 124 based on the position of at least one blade of the plurality of blades 112, and a time to spark the igniting of the air-fuel mixture to cause combustion in the combustion chamber 124 based on the position of at least one blade of the plurality of blades 112. Based on the data, the controller 134 controls the valve 145 and the ignitor 130.

As shown in FIGS. 1-3 and 5-6, the plurality of dispensers 118 may be employed in the turbine engine system 100. Each of the plurality of dispensers 118 may be spaced circumferentially around the housing 120. The spacing may be even between each of the plurality of dispensers 118 or other spacing patterns may be used depending on the application. In some embodiments, there may be 3, 5, 7, 11, 15 or more plurality of dispensers 118 which correspond to 4, 6, 8, 12 and 16 blades designs of the turbine engine system 100. Generally, there will be one less dispenser 118 than a blade 112 because one mounting position for a dispenser 118 is instead dedicated to the exhaust pipe 122, although other positionings of the exhaust pipe 122 are possible. In some embodiments, there may be half or one-third the amount of the plurality of dispensers 118 compared to the plurality of blades 112 depending on the application. The controller 134 is in communication with the plurality of dispensers 118 and controls each of the plurality of dispensers 118 while in some embodiments, the air compressor 138 and/or the fuel pump 140 (as in FIG. 5) distribute the high-pressure air and fuel to each of the plurality of dispensers 118.

Figure 7A:
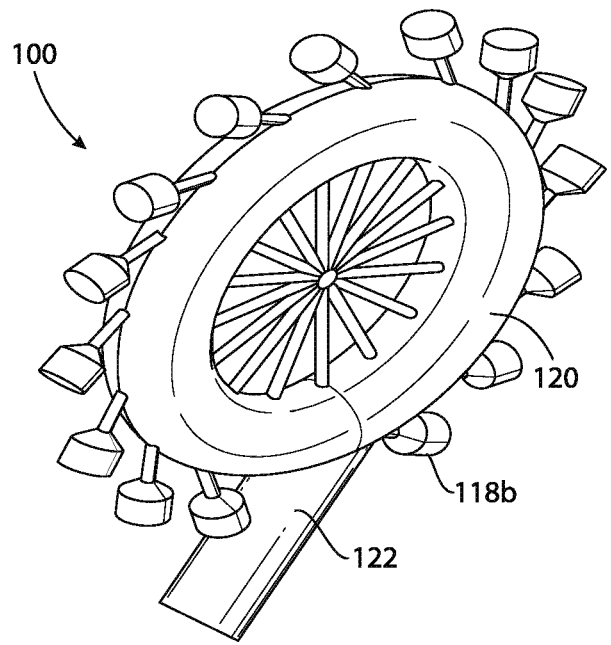
FIG. 7A is a perspective view of the turbine engine system with a 16-blade turbine, in accordance with some embodiments.
Figure 7B:
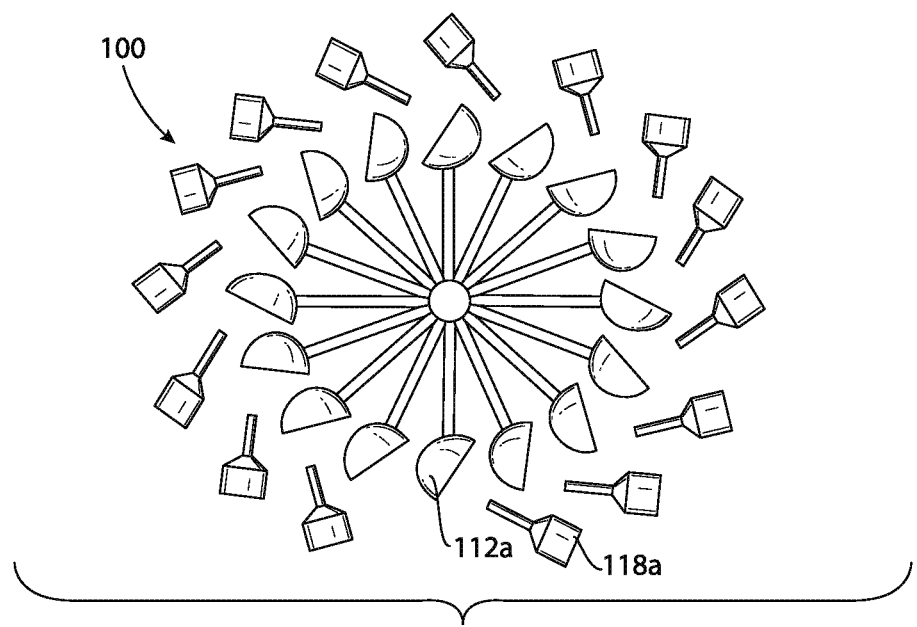
FIG. 7B is a front view of the turbine engine system with a 16-blade turbine with the housing removed, in accordance with some embodiments.
Figure 8A:
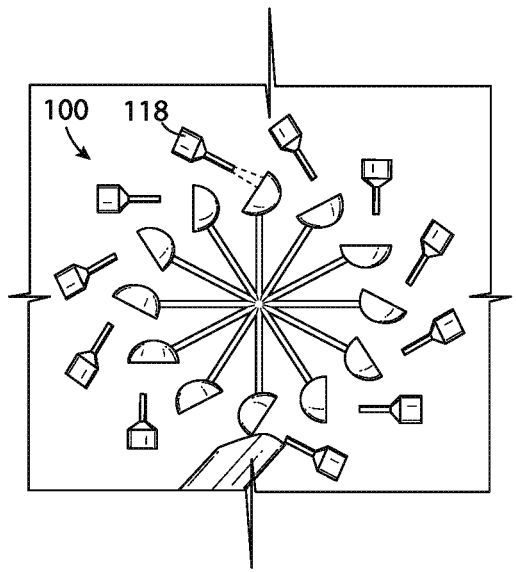
FIGS. 8A-8F show examples of the operation of a 12-blade turbine engine system, in accordance with some embodiments.
Figure 8B:
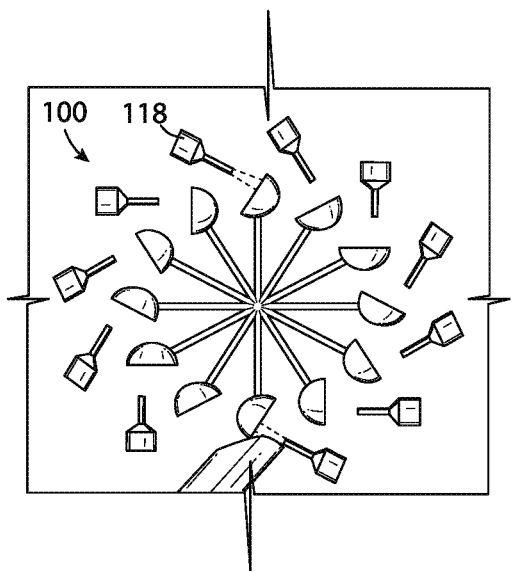
Figure 8C:
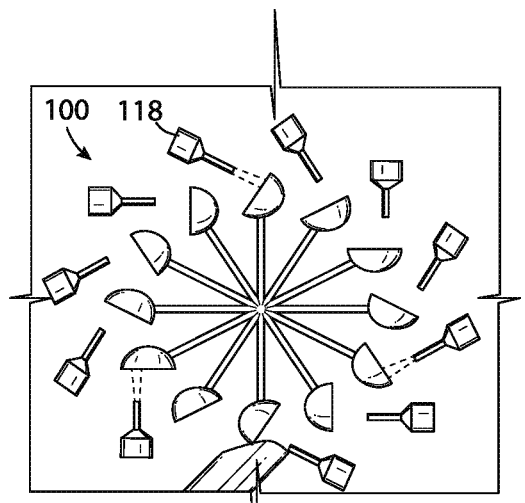
Figure 8D:
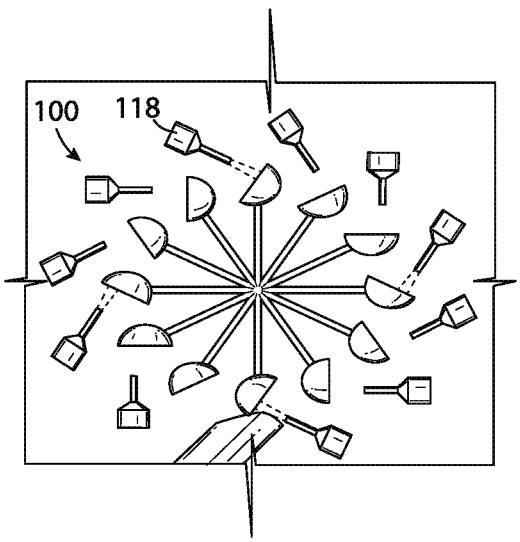
Figure 8E:
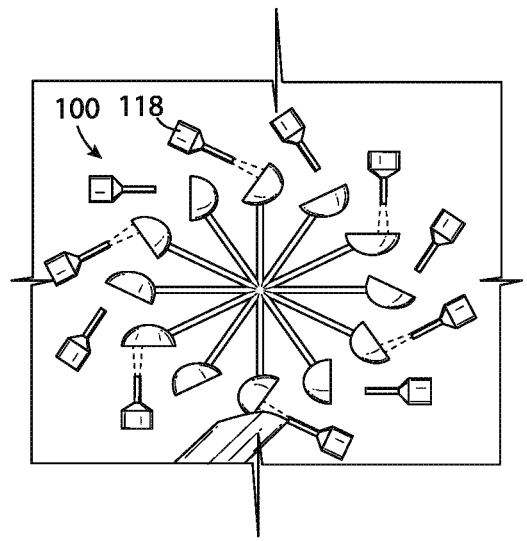
Figure 8F:
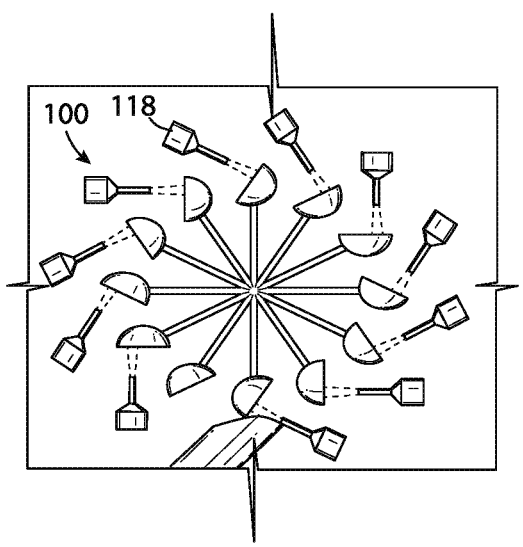
Figure 16:
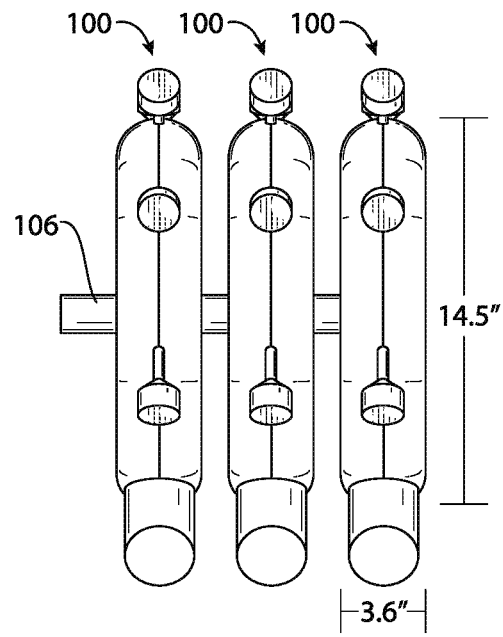
FIG. 16 is a side view of the plurality of turbine engine systems, in accordance with some embodiments.

FIG. 7A is a perspective view of the turbine engine system 100 with a 16-blade turbine design, in accordance with some embodiments, and FIG. 7B is a front view of the turbine engine system 100 with a 16-blade turbine with the housing 120 removed, in accordance with some embodiments. In order to increase rotation speed (rpm), torque, and power, additional, longer spokes with larger blades may be used. For example, an 8-blade turbine may be employed for some designs such as a small passenger vehicle. By increasing the number of spokes 104 of the plurality of spokes 104 from eight to 16, using longer spokes 104 than the 8-blade turbine, and increasing the size of the blade 112 (e.g., the diameter of the hemispherical-shaped cup with an open surface) more power can be achieved. This may be used to generate power for a larger vehicle such as a 1,000 to 3,000 ton aquatic vessel. In some embodiments, the 8-blade turbine may have a housing 120 with a 14.5-inch diameter and a thickness of 3.6 inches. The length from the shaft 106 to the end of one of the plurality of blades 112 along the length of the spoke 104 may be six inches. FIG. 16 shows these sample dimensions for the 8-blade turbine. The size of the housing is dependent on the diameter of the plurality of blades 112 and the thickness of the housing is dependent on the size of each of the plurality of blades 112. When the number of blades is increased from eight to 16 and the size of the blades 112 are increased, the 16-blade turbine, for example, may have a 30-inch diameter and be 8 inches in thickness which results in about 10 times more power than the 8-blade turbine.

Any number of dispensers 118 may be activated at any time or in any sequence to move the turbine 114. FIG. 8A-8F show examples of the operation of a 12-blade turbine engine system, in accordance with some embodiments. The number of dispensers 118 activated at the same time may be used to classify the type of ignition. For example, a 1-ignition means that one dispenser 118 is activated at any given moment whereas a 3-ignition means that three dispensers 118 are activated at the same time. Other examples may be 4-ignition, 6-ignition, and full ignition. In full ignition, all dispensers 118 of the plurality of dispensers 118 are activated at the same time. For example, a single ignition, 2-ignition, 3-ignition, 4-ignition, 6-ignition, and full ignition are shown in FIGS. 8A-8F, respectively. The controller 134 determines which dispensers 118 to activate such as three dispensers 118, seven dispensers 118 or 11 dispensers 118 and how often. The plurality of dispensers 118 may be activated at the same time or in a particular sequence. In this way, a desired torque and desired rotational speed can be achieved by the turbine 114 of the turbine engine system 100. In some embodiments, by having more firing dispensers 118, more power, more torque and stability can be achieved at a timing interval compared to having only one dispenser 118. This also reduces the risk of overheating.

Figure 9A:
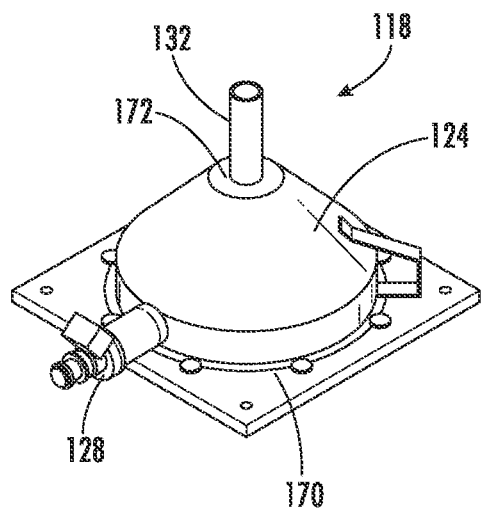
FIGS. 9A-9C are a top perspective view, a bottom perspective view and a side view of the combustion chamber of the dispenser, in accordance with some embodiments.
Figure 9B:
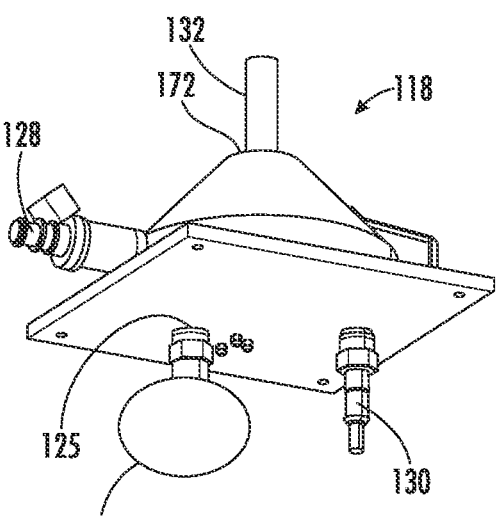
Figure 9C:
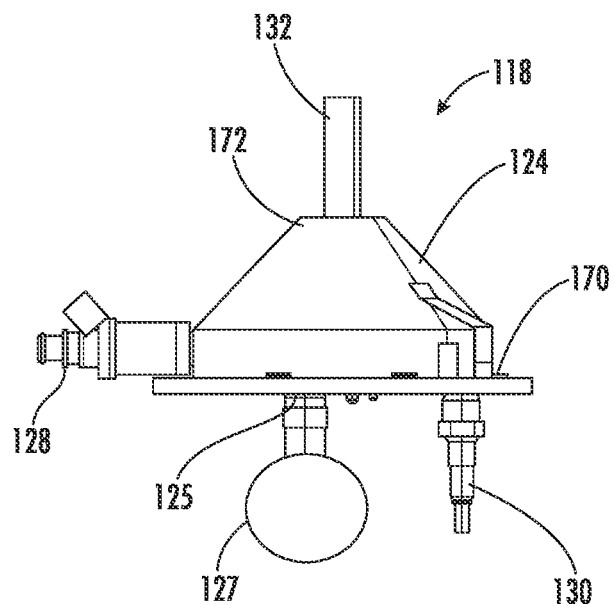

In some embodiments, the combustion chamber 124 of the dispenser 118 has a funnel shape with a top surface 170 and a bottom surface 172. FIGS. 9A-9C are a top perspective view, a bottom perspective view and a side view of the combustion chamber 124 of the dispenser 118, in accordance with some embodiments. The top surface 170 may be wider than the bottom surface 172. For example, the top surface 170 may be at least two, three, four or four and half times wider than the bottom surface 172. The funnel—the combustion chamber 124—is sized to accommodate an explosion of the air-fuel mixture and spark. In some embodiments, the diameter of the nozzle 132 may be 14.5 mm to 17.5 mm, the width of the bottom surface 172 may be 14.5 mm to 20 mm, and the width of the top surface 170 may be 90 mm to 110 mm. In some embodiments, the diameter of the nozzle is 15.5 mm, the width of the bottom surface 172 is 17.5 mm, and the width of the top surface 170 is 101.6 mm. FIG. 9C depicts the combustion chamber 124 with example dimensions. The funnel shape of the combustion chamber 124 provides more space for the combustion reaction and helps to channel flow into the nozzle 132. For example, the exploded gas in the combustion chamber 124 will be guided through the bottom surface 172 into the nozzle 132. The exploded gas is the great force that pushes the blade 112 to rotate the turbine 114. A small portion of the same energy also pushes an air intake valve 125 to a closed position (as described with reference to FIGS. 11A-11D).

An air intake valve 125 is coupled to the top surface 170 of the combustion chamber and allows air into the combustion chamber 124 from an air compressor 127 which is directly coupled to the combustion chamber 124. This direct coupling enables a large amount of air into the combustion chamber 124 while using a small amount of electricity. In some embodiments, each combustion chamber 124 is coupled to an air compressor 127. A fuel injector 128 is coupled to the combustion chamber 124 and injects fuel into the combustion chamber from a fuel system. An ignitor 130 is coupled to the combustion chamber 124 and supplies a spark for combustion of an air-fuel mixture in the combustion chamber 124. In some embodiments, the ignitor 130 is directly opposite the fuel injector 128. For example, the ignitor 130 is in direct line with the fuel injector 128 with an adequate distance for optimal ignition position.

In some embodiments, the air compressor 127 is located between the fuel injector 128 and the ignitor 130 which enables the high-pressure vaporized fuel to mix with the air at a desired proportion, such as an air-to-fuel ratio of 14.7:1 by mass (weight). A nozzle 132 has a first nozzle end coupled to the bottom surface 172 of the combustion chamber 124 and a second nozzle end positioned to direct the discharged fluid after combustion in the combustion chamber 124 toward the open surface of the plurality of blades 112 driving the turbine 114.

Figure 10A:
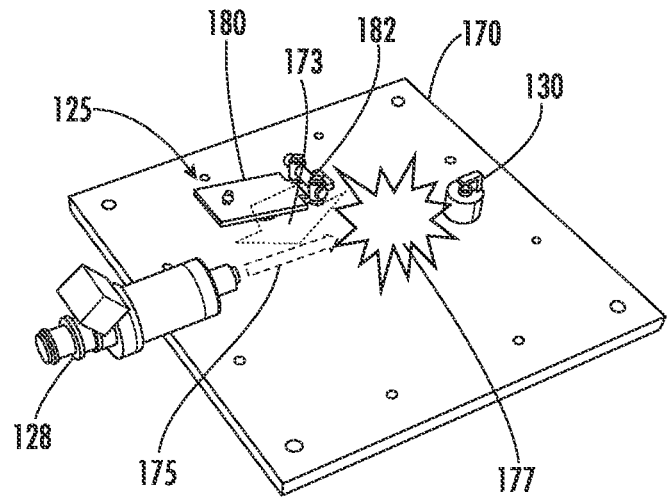
FIGS. 10A-10B show a top perspective view and a side view of an air intake valve on the top surface of the combustion chamber, in accordance with some embodiments.
Figure 10B:
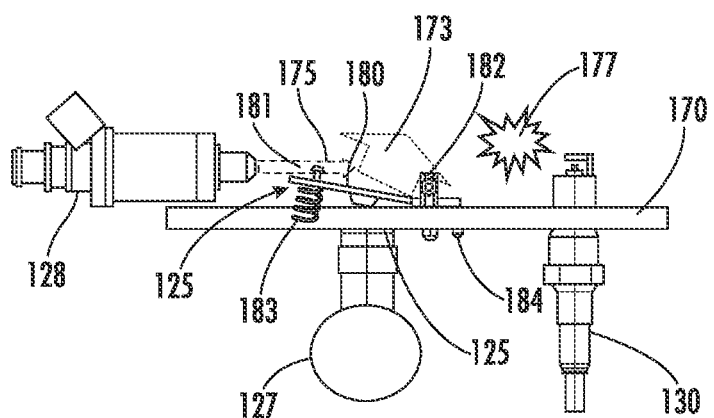

FIGS. 10A-10B show a top perspective view and a side view of an air intake valve 125 on the top surface 170 of the combustion chamber 124, in accordance with some embodiments. Arrow 175 represents a stream of high pressure vaporized fuel such as gasoline. The timing and duration of the combustion for the best air-to-fuel ratio for explosion may be controlled by the fuel injector 128. In some embodiments, the fuel injector 128 is an Electronic Fuel Injector. Arrow 173 represents the pressurized air from the air compressor 127 which mixes with the stream of high pressure vaporized fuel (e.g., arrow 175) in the combustion chamber 124. When the fuel injector 128 finishes injecting fuel, the ignitor 130 supplies the spark and the air-fuel mixture explodes (arrow 177 represents an explosion) in the combustion chamber 124.

Figure 11A:
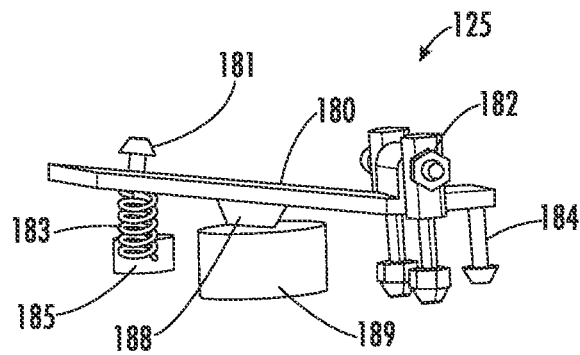
FIGS. 11A-11C are a top perspective view, a side view, and a top view of the air intake valve in the closed position, in accordance with some embodiments.
Figure 11B:
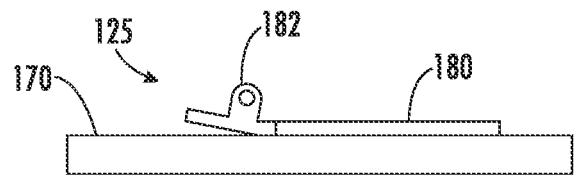
Figure 11C:
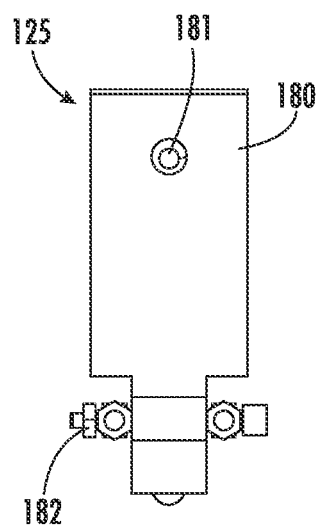
Figure 11D:
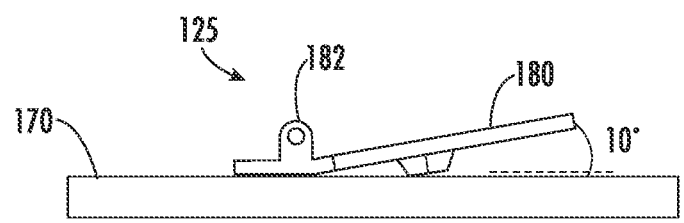
FIG. 11D is a side view of the air intake valve in the open position, in accordance with some embodiments.

FIGS. 11A-11C are a top perspective view, a side view, and a top view of the air intake valve 125 in the closed position, in accordance with some embodiments. FIG. 11D is a side view of the air intake valve 125 in the open position, in accordance with some embodiments. The air intake valve 125 may include a flap 180, a hinge 182 coupled to the top surface 170 of the combustion chamber 124, a spring 183 between the flap 180 and the top surface 170 of the combustion chamber 124, and a fastener, such as a screw 184. The screw 184 is adjustable to control an opening angle of the flap 180 relative to the top surface 170 of the combustion chamber 124 in the second open position. A fastener 181, such as screw, is coupled to the flap 180 and inserted into a top portion of the spring 183. A bottom portion of the spring 183 is inserted into a hole 185 in the top surface 170 of the combustion chamber 124 so that the spring 183 pushes the flap 180 in a fixed path to the open position. In other embodiments, the explosion (arrow 177 in FIGS. 10A-10B) forces the flap 180 to a closed position.

The screw 184 controls the opening angle of the flap 180 relative to the top surface 170 of the combustion chamber 124. In some embodiments the angle may be at least 7° to 18°, such as 10° to 15°, from the top surface 170 of the combustion chamber 124. A convex 188 may be mounted on the underside of the flap 180 or may be integrated as part of flap 180. The convex 188 blocks an air intake pipe 189 of the air intake valve 125 to prevent airflow. In this way, the explosion (arrow 177 in FIGS. 10A-10B) easily closes off the air intake path. The flap 180 is forced to the first closed position by an explosion of the air-fuel mixture and the spark in the combustion chamber 124.

When mounted, the air intake valve 125 faces the interior of the combustion chamber 124. The flap 180 may open and close via the hinge 182 so that the air intake valve 125 has a first closed position and a second open position. The angle that the flap 180 may open is limited by the shape of the flap 180 and may be 10° to 15° relative to the top surface 170 of the combustion chamber 124. The air intake valve 125 is in the first closed position due to the force of the combustion in the combustion chamber 124, and in the second open position due to the air compressor 127 directly coupled to the combustion chamber 124 forcing the flap 180 open to allow air into the combustion chamber 124. The shape of the flap 180 may be generally rectangular as shown. The size may be 37±2 mm by 20±2 mm by 1.5±0.5 mm.

Figure 12A:
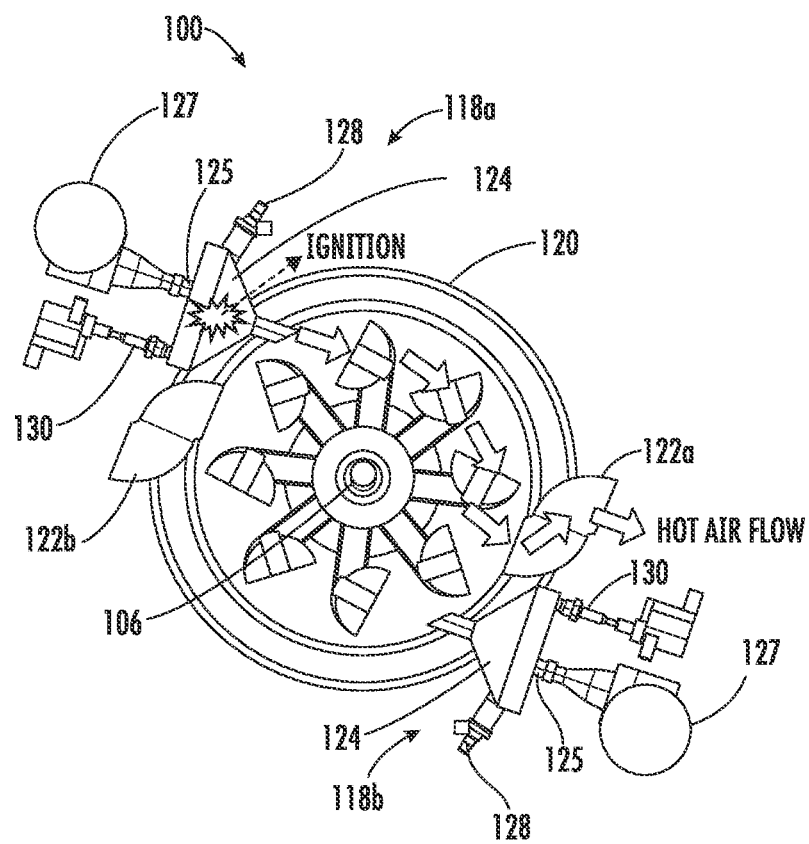
FIGS. 12A and 12B are a perspective view and side view of a turbine engine system having a plurality of exhaust pipes with a portion of the housing removed, in accordance with some embodiments.
Figure 12B:
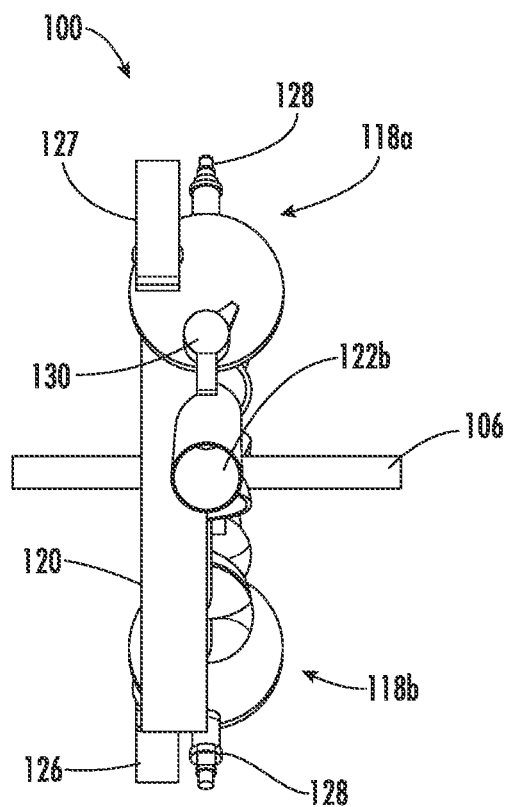

In some embodiments, the turbine engine system 100 may have a plurality of exhaust pipes 122n. FIGS. 12A and 12B are a perspective view and side view of a turbine engine system having a plurality of exhaust pipes with a portion of the housing 120 removed, in accordance with some embodiments. As described herein, a plurality of dispensers 118 are coupled to the housing 120 and spaced circumferentially around the shaft 106. The plurality of dispensers 118 may be equally spaced circumferentially around the housing 120. Each of the plurality of dispensers 118 may be designated as 118a, 118b, 118c ... 118n. In this embodiment, there are two dispensers, 118a and 118b respectively.

The plurality of exhaust pipes 122n is coupled to the housing 120. The plurality of exhaust pipes 122n are coupled to the housing 120 and spaced circumferentially around the shaft 106. The plurality of exhaust pipes 122n may be equally spaced circumferentially around the housing 120. Each of the plurality of exhaust pipes 122n may be designated as 122a, 122b, 122c ... 122n. The plurality of exhaust pipes 122n (e.g., 122a and 122b) extend away from the shaft 106 directing the discharged fluid out of the housing 120. Each exhaust pipe 122a and 122b of the plurality of exhaust pipes 122n corresponds to a respective dispenser (e.g., 118a and 118b) of the plurality of dispensers 118 which enables gases to exit the housing more efficiently compared to having one exhaust pipe for multiple dispensers. The plurality of exhaust pipes 122n is located along the circumference of the housing 120 and each exhaust pipe is located just before the next dispenser. For example, as shown, exhaust pipe 122a is located before dispenser 118b. Put another way, the exhaust pipe 122a is located adjacent to dispenser 118b and between two dispensers 118a and 118b of the plurality of dispensers 118. The plurality of exhaust pipes 122n in these locations relative to the plurality of dispensers 118 allows the discharged fluid to vent from the housing 120 before the next dispenser injects more gases into the housing 120.

Figure 13:
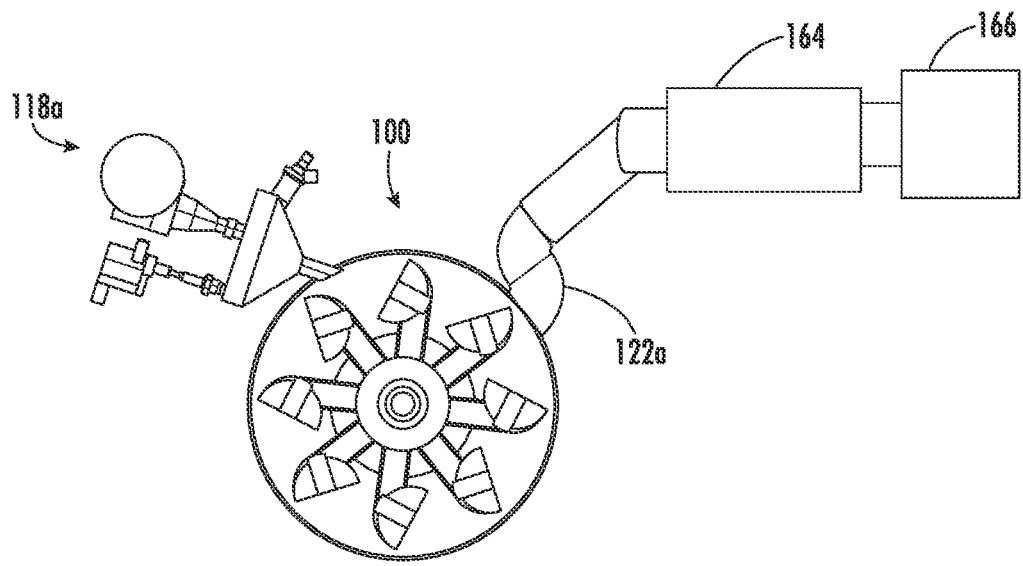
FIG. 13 is a schematic of the turbine system with an exhaust system with a portion of the housing removed, in accordance with some embodiments.

The plurality of exhaust pipes 122n may be curved and comprises a S-shape, S-bend, or serpentine shape. Other shapes may be used depending on the application and space considerations. FIG. 13 is a schematic of the turbine system 100 with an exhaust system with a portion of the housing 120 removed for illustrative purposes, in accordance with some embodiments. An exhaust system may comprise the plurality of exhaust pipes 122*n*, a catalytic converter 164 and in some embodiments, a muffler 166. The catalytic converter 164 is coupled to the plurality of exhaust pipes 122*n*. For example, the exhaust pipes (e.g., 122*a*, 122*b*, 122*c* . . . 122*n*) may converge into a single pipe then to the catalytic converter 164. The catalytic converter 164 is configured to eliminate carbon monoxide and hydrocarbons from the discharged fluid thus reducing emissions and pollution in the environment. In this example, there is a single dispenser 118*a* and a single exhaust pipe 122*a*. The exhaust pipe 122*a* is coupled to the catalytic converter 164. In some embodiments, a muffler 166 may also be used in the exhaust system as an acoustic device to reduce noise.

Figure 14:
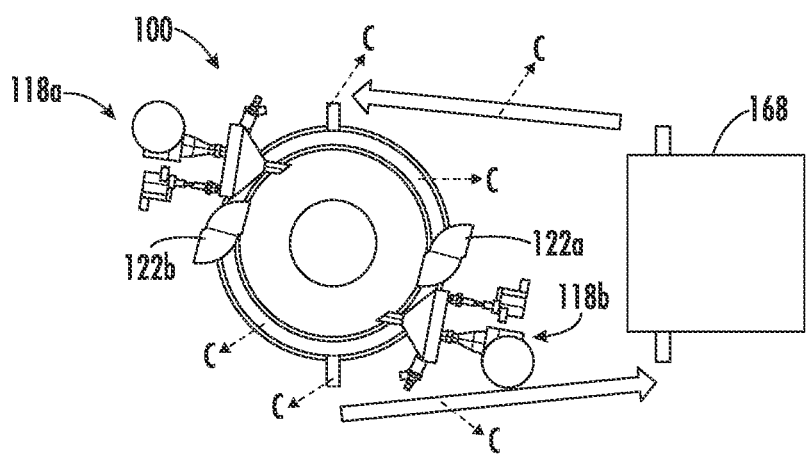
FIG. 14 is a schematic of the turbine system with a cooling system, in accordance with some embodiments.

FIG. 14 is a schematic of the turbine system 100 with a cooling system, in accordance with some embodiments. In some embodiments, as described herein, the cooling system may include liquid coolant conduits (represented by large arrows C in FIG. 14) coupled to the inside surface of the housing 120. Liquid coolant circulates through the conduits and a radiator 168 to efficiently cool and dissipate heat in the discharged fluid after combustion in the combustion chambers 124 of the plurality of dispensers 118. The radiator 168 may be located outside of the turbine engine system 100, and a fan may also be used for additional cooling properties.

Figure 15A:
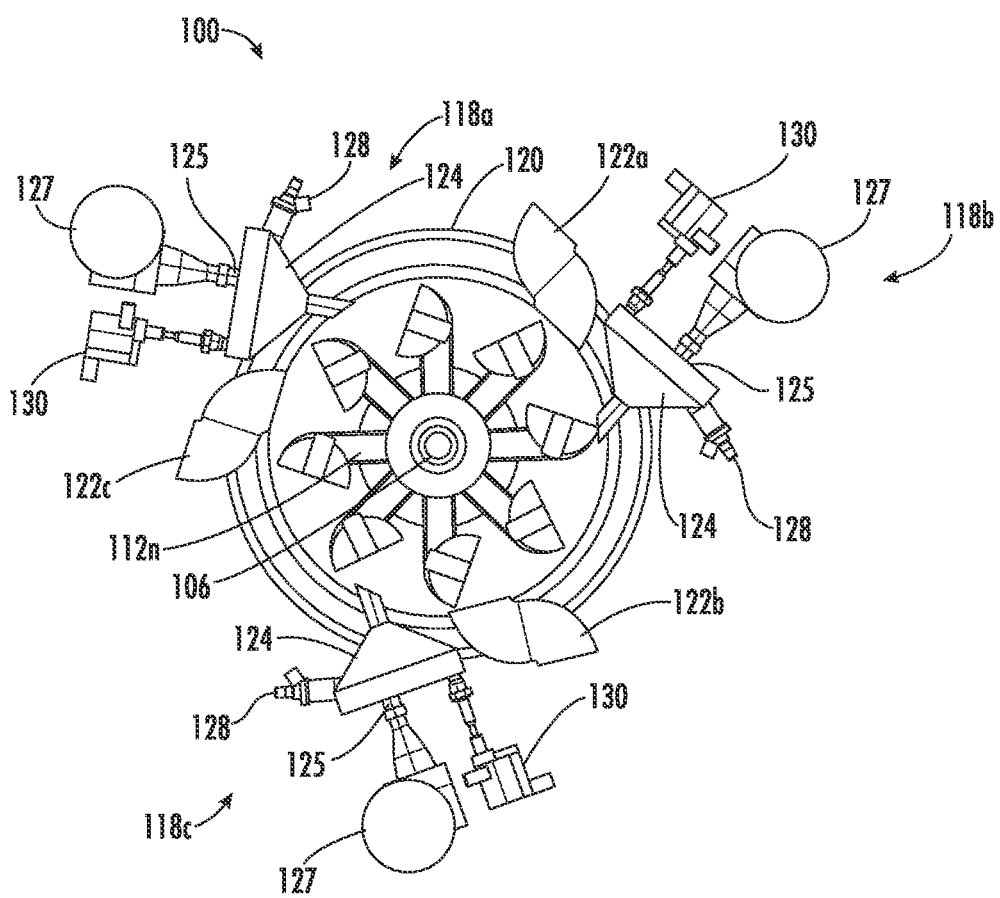
FIG. 15A is a perspective view of the turbine engine system with an 8-blade turbine, in accordance with some embodiments.
Figure 15B:
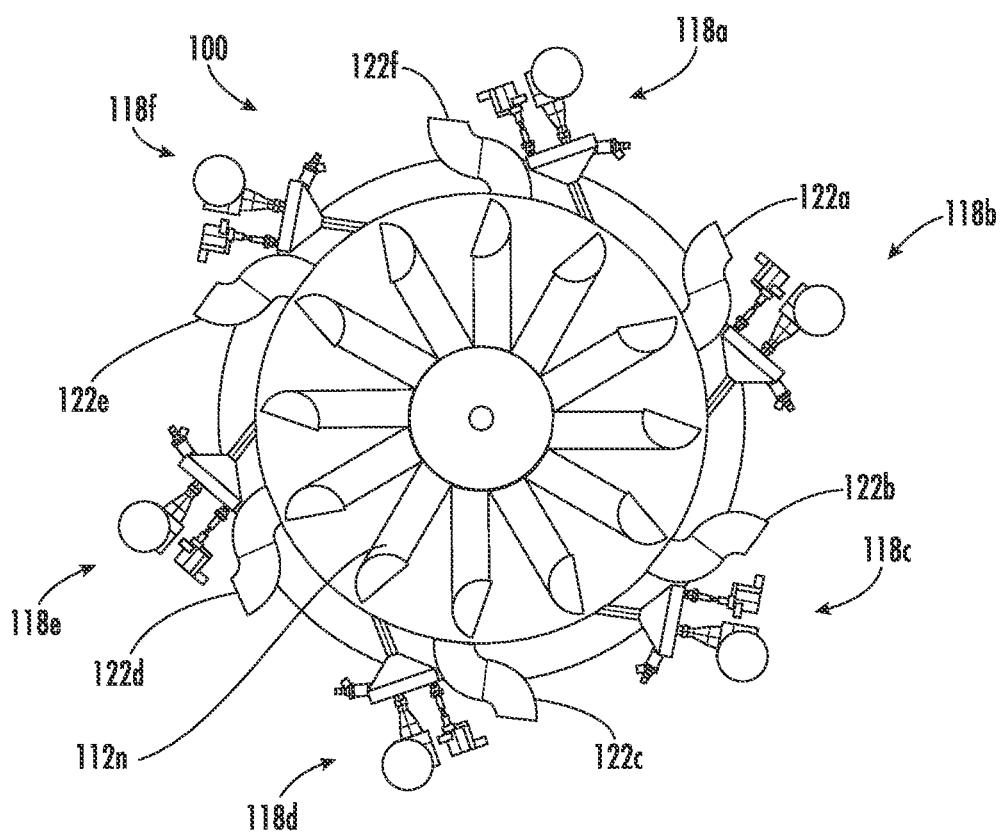
FIG. 15B is a perspective view of the turbine engine system with a 12-blade turbine, in accordance with some embodiments.

Various configurations for the number of blades 112, the number of dispensers 118 and the number of exhaust pipes 122 for the turbine engine system 100 are possible depending on the application. FIG. 15A is a perspective view of the turbine engine system with an 8-blade turbine, in accordance with some embodiments. In this example, the turbine engine system 100 has eight blades (labeled as 112*n*), three dispensers (118*a*, 118*b*, 118*c*) and three exhaust pipes (122*a*, 122*b*, 122*c*). FIG. 15B is a perspective view of the turbine engine system with a 12-blade turbine, in accordance with some embodiments. In this example, the turbine engine system 100 has twelve blades 112 (labeled as 112*n*), six dispensers (118*a*, 118*b*, 118*c*, 118*d*, 118*e*, 118*f*) and six exhaust pipes 122 (122*a*, 122*b*, 122*c*, 122*d*, 122*e*, 1220. Exhaust pipe 122*a* corresponds to dispenser 118*a*, with exhaust pipe 122*a* being positioned circumferentially along the housing before the next dispenser 118*b* so that gases generated from dispenser 118*a* can be vented prior to gases being introduced from dispenser 118*b*. In some embodiments, the plurality of dispensers 118 may ignite at the same time so that more torque is generated to turn the turbine 114. This may be useful when the turbine engine system 100 first starts or when acceleration is needed.

FIG. 16 is a side view of a plurality of turbine engine systems, in accordance with some embodiments. In this example, a plurality of turbine engine systems such as three turbine engine systems 100 are coaxially coupled to the shaft 106 as another way to increase power for a particular application. There may be one controller 134 or a plurality of controllers working together to coordinate the control of each of the plurality of dispensers 118.

Figure 17A:
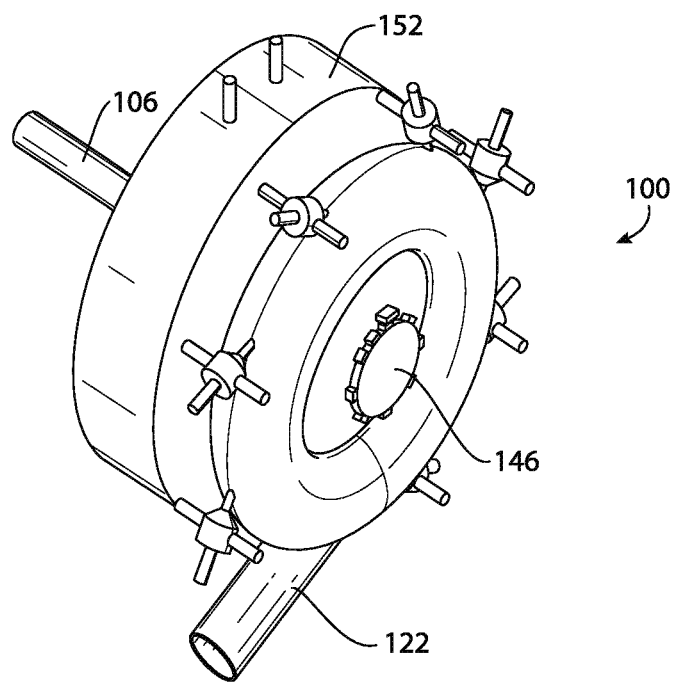
FIG. 17A is a perspective view of the turbine engine system coupled to an axial flux motor, in accordance with some embodiments.
Figure 17B:
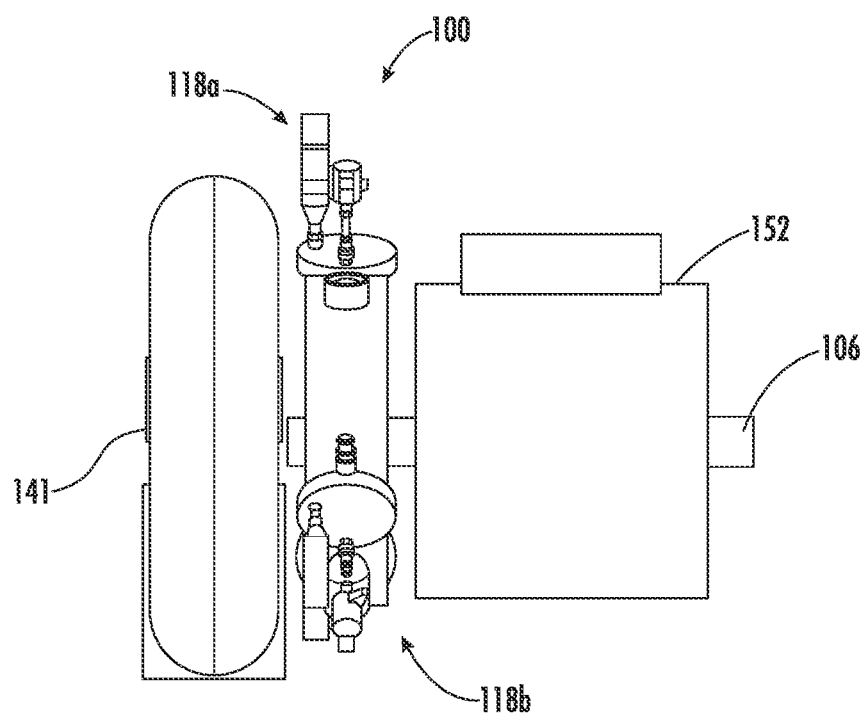
FIG. 17B is a side view of the turbine engine system coupled to an axial flux motor and a fuel tank, in accordance with some embodiments.

The shaft 106 of the turbine engine system 100 may be coupled to other components such as a motor, generator, wheel, propeller or transmission system, and drive these components. FIG. 17A is a perspective view of the turbine engine system 100 coupled to an axial flux motor 152, in accordance with some embodiments. In a specific example, the axial flux motor 152 may have a 368 mm diameter, a 98 mm thickness and weigh 37 kg. For example, this configuration where the axial flux motor 152 is aided by the turbine engine may generate 240 kW (750 V×320 A) of electricity at 2500 rpm and have about 95% efficiency. Comparably, a large 3.0 L piston engine could be used to generate 240 kW but the efficiency is only 35%. FIG. 17B is a side view of the turbine engine system 100 coupled to an axial flux motor 152 and a fuel tank 141, in accordance with some embodiments. The fuel tank 141 supplies fuel for the dispensers 118 of the turbine engine system 100, and the turbine engine systems 100 assists the axial flux motor 152 to generate electricity. In this specific example, the axial flux motor 152 may have a 380 mm diameter, a 352 mm thickness and weigh 122 kg. For example, this configuration where the axial flux motor 152 is aided by the turbine engine may generate 282 kW of electricity or 660 kW peak output power and have about 95% efficiency. The turbine engine system 100 in this configuration has a smaller footprint and lighter weight than the conventional piston-based engine. In another embodiment, the turbine engine system 100 may be coupled to a plurality of axial flux motors depending on the application.

Figure 18A:
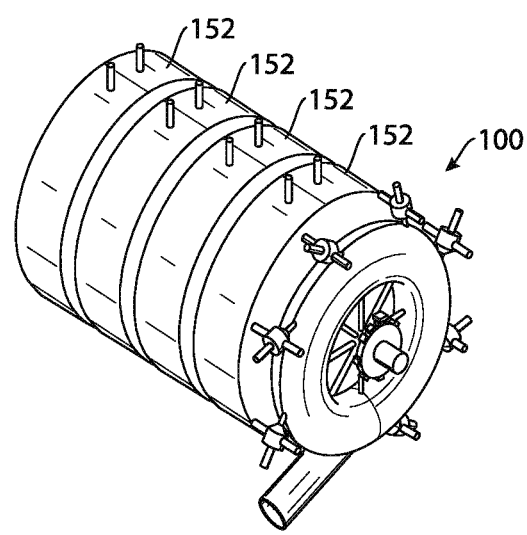
FIG. 18A shows a turbine engine system coupled to a plurality of axial flux motors, in accordance with some embodiments.
Figure 18B:
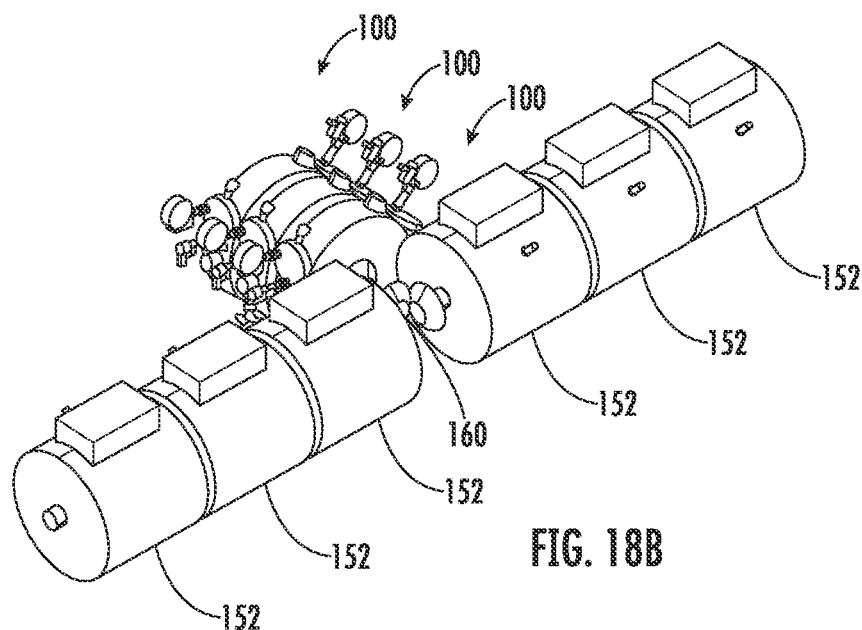
FIGS. 18B-18C are a plurality of turbine engine systems coupled to a plurality of axial flux motors, in accordance with some embodiments.
Figure 18C:
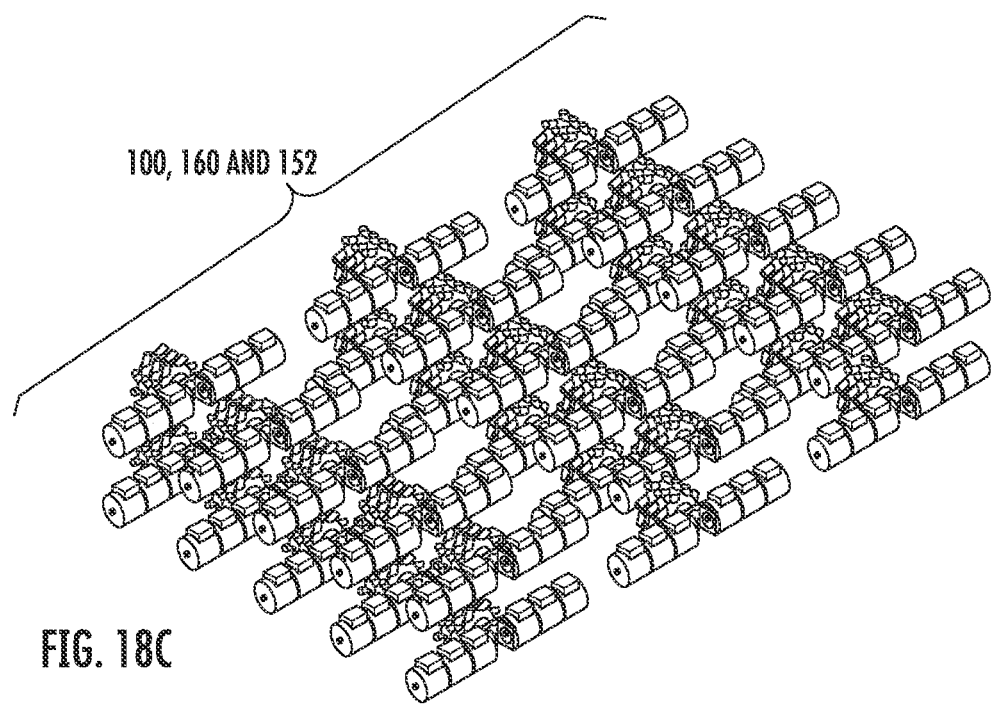

FIG. 18A shows a turbine engine system 100 coupled to a plurality of axial flux motors, in accordance with some embodiments. This may be used for replacing the engine in, for example, a locomotive of a passenger train, freight train, or high-speed train. Replacing the conventional locomotive with the turbine engine system 100 saves weight and significantly reduces the amount of powertrain components. For example, the complicated pantograph on top of the locomotive and the main transformer are no longer needed. Also, for a typical electric train, a high-voltage wire is embedded in or above the train track to operate the train. This can be eliminated when implementing the turbine engine system 100. The thermal efficiency of the turbine engine system 100 is significantly higher than the conventional gas-turbine locomotive engine such as 50-85% versus 45%. FIGS. 18B and 18C are a plurality of turbine engine systems 100 coupled to a plurality of axial flux motors 152, in accordance with some embodiments. In these embodiments, a gearbox 160 may be coupled to the plurality of turbine engine systems 100 and the plurality of axial flux motors 152. The gearbox 160 may be a counterrotating gearbox with, in some embodiments, a T-style design, meaning the output shafts are on the same axis as one another while the input shaft is coupled to the plurality of axial flux motors 152 at 90° to the output shafts. In other embodiments, the counterrotating gearbox 160 may be a direct drive design meaning the output shafts and the input shaft are on the same axis, and the plurality of axial flux motors 152 is directly coupled to one of the output shafts thereby driving one of the turbines of the plurality of turbine engine systems 100. In some embodiments, depending on the amount of turbine engine systems and the amount of power sources, such as axial flux motors 152, 100 kilowatts to 500 kilowatts of power, 500 kilowatts to 3 megawatts of power, or 20 megawatts to 480 megawatts may be produced.

Figure 19:
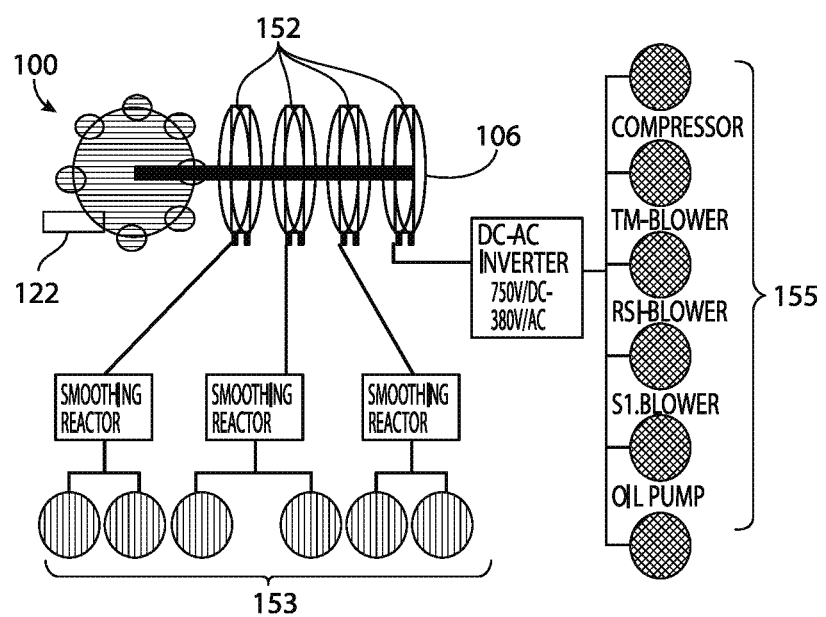
FIG. 19 is an example block diagram for the turbine engine system in the locomotive, in accordance with some embodiments.

FIG. 19 is an example block diagram for the implementation for the turbine engine system 100 in the locomotive. For example, the turbine engine system 100 coupled to the plurality of axial flux motors 152 is used to drive traction motors 153 and other components 155 of the train.

Figures 20, 21:
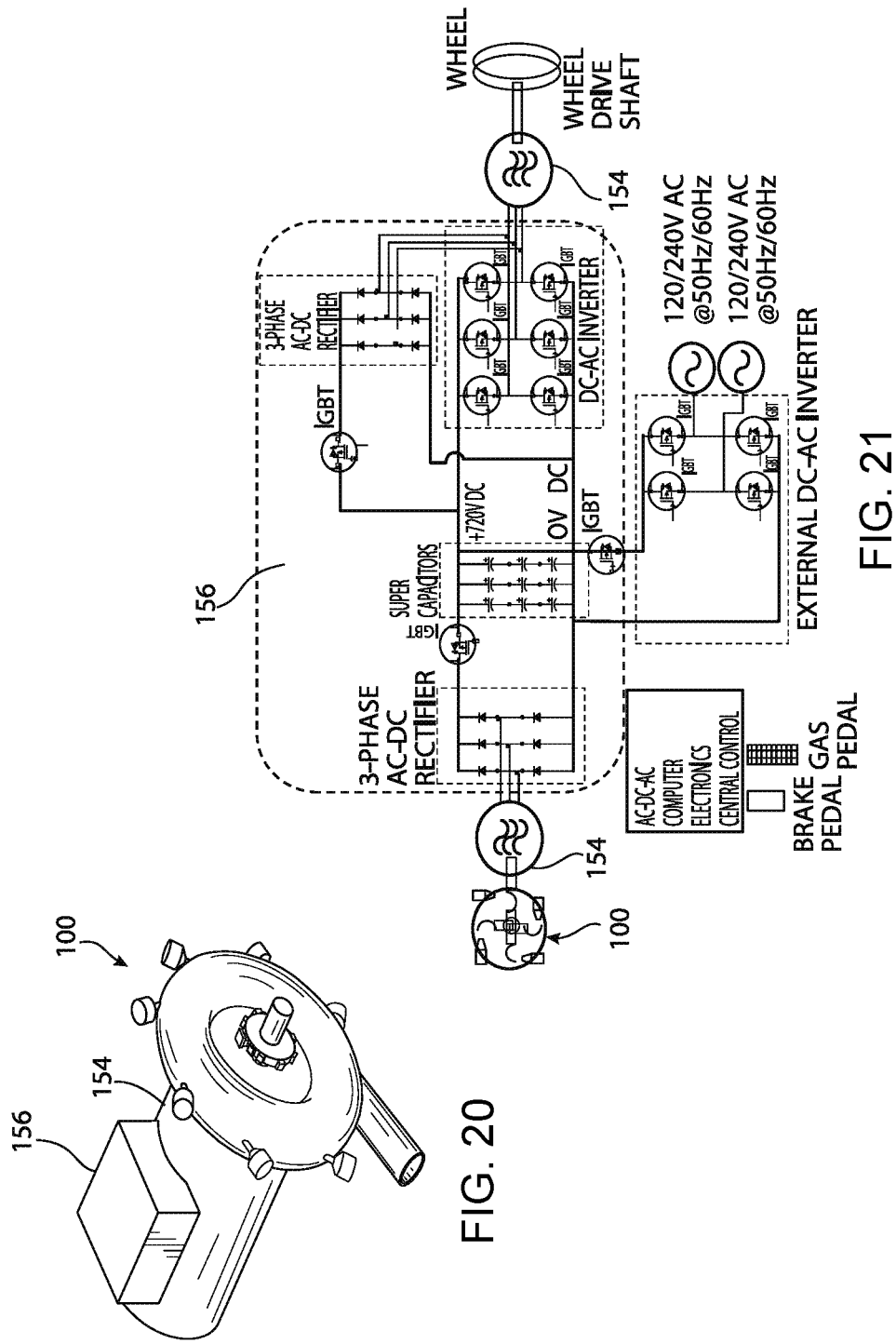
FIG. 20 is a turbine engine system used in an electric vehicle system, in accordance with some embodiments.
FIG. 21 is an example block diagram for the implementation for the turbine engine system in an electric vehicle, in accordance with some embodiments.

FIG. 20 is a turbine engine system 100 used in an electric vehicle system, in accordance with some embodiments. The turbine engine system 100 may be coupled to a generator of a permanent magnet motor (PMM) 154 combined with an electrical box 156 which contains a 3-phase AC-DC rectifier to operate similar to a large Lithium battery such as in an electric vehicle. For example, this configuration is a high-efficient, quiet, lightweight, small power source. In this way, supercapacitors collect the kinetic energy when the brake pedal is applied or when the accelerator pedal is released.

This eliminates the need to recharge the lithium-ion battery and charging stations in general. The turbine engine system 100 with the permanent magnet motor generator can be implemented on an existing electric vehicle so retooling of existing components for the vehicle is not needed. FIG. 21 is an example block diagram for the implementation for the turbine engine system 100 in an electric vehicle. In this scenario, the electrical box 156 includes supercapacitors.

In some embodiments, two or more turbine engine system 100 with the permanent magnet motor generators can be coupled together for more power generations and be used in a large truck such as a semi-trailer truck or a locomotive. In other embodiments, the turbine engine system 100 with the permanent magnet motor generator may be implemented to supply electricity to a house, business or factory.

Figure 22:
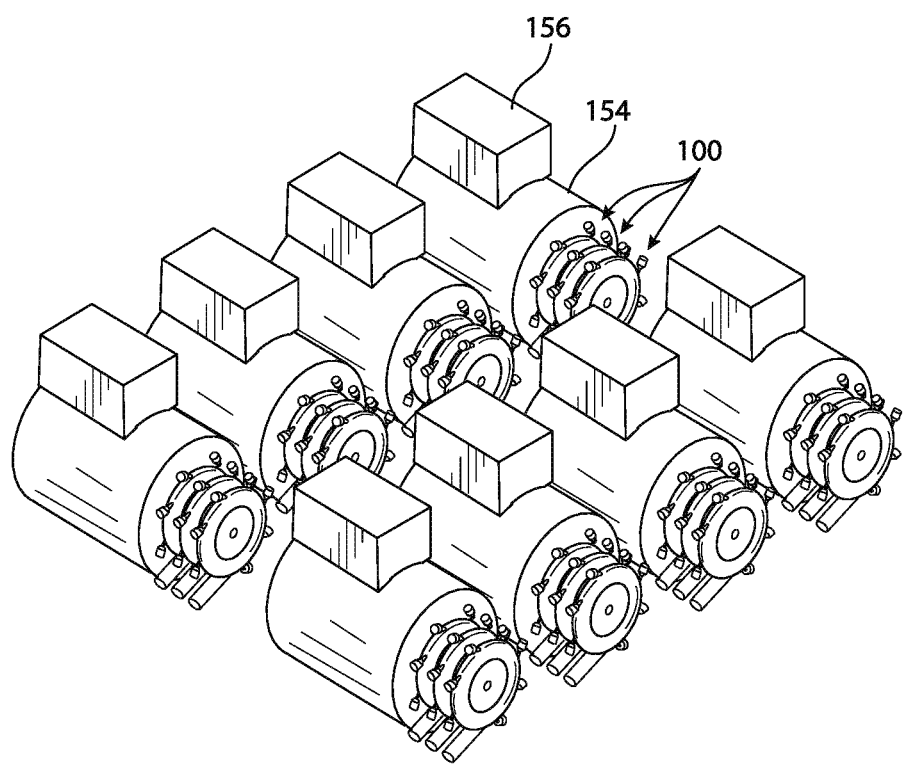
FIG. 22 is a plurality of turbine engine systems coupled to a generator, in accordance with some embodiments.

In some embodiments, the configuration of FIGS. 18A-18C, or the turbine engine system(s) 100 coupled to a plurality of axial flux motors, may be used for a large power plant/farm generator. Each turbine engine system 100 coupled to a plurality of axial flux motors may produce at least 500 kW, such as at least 750 kW, or such as at least 960 kW for a 16-blade turbine. Comparably, a large wind turbine may produce an average of 2.5 to 3.0 MW. Therefore, the turbine engine system 100 coupled to the plurality of axial flux motors may replace one traditional wind turbine. The power plant/farm may use artificial intelligence for control of the system so energy is not wasted. Traditional off-shore wind turbines used in power plant/farms are very large such as approximately 850 feet, whereas the turbine engine system 100 implemented in the power plant/farm is much smaller. In some embodiments, a plurality of turbine engine systems (as shown in FIG. 16) may be coupled to the generator/PMM 154 and electrical box 156 thereby producing 500 kW to 5 MW synchronously. FIG. 22 is a plurality of turbine engine systems coupled to a generator/PMM 154, in accordance with some embodiments. This configuration may form a mega power plant/farm producing power of 50 MW to 5 GW and provide dynamic electricity supply for peak-hour and off-peak hours.

The power plant/farm implementations for the plurality of turbine engine systems 100 provides redundancy and resilience while traditional, costly components such as transmission lines, poles, towers, transformers, switches/relays, and power distribution hubs are eliminated. A smaller footprint of land is needed than for a traditional power plant/farm. Also, the turbine engine system 100 has an internal cooling system so a large external cooling system is not needed, and fuel is not consumed to heat up water for steam. The turbine engine systems implemented as power plant/farm may be located near where the power is needed so that transformers or high-voltage power lines are not required thereby also reducing losses during transmission.

In some embodiments, such as shown in FIG. 18C, large quantities of turbine engine systems 100 coupled to large quantities of axial flux motors (or other power sources) may form a power plant/farm. The power plant/farm may generate electricity on demand by using artificial intelligence and have reliability free from a vulnerable power grid. Because infrastructure is not required, the power plant/farm may be located near a city, heavy industrial area, or conveniently implemented in an existing sub-station. With the use of catalytic convertors 164, pollution is significantly decreased. The power plant/farm may be located near a large greenhouse to grow food and plants. For example, the carbon dioxide and water vapor expelled from the exhaust system may be mixed with sunlight or LED lights to produce food or plants in an efficient manner. The greenhouse may emit oxygen by the photosynthesis process for the environment.

Figure 24:
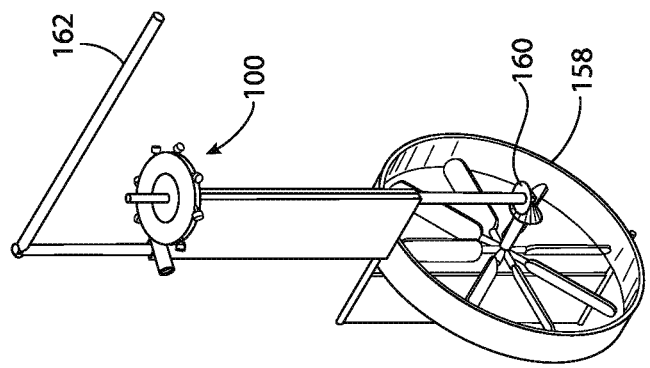
FIG. 24 is a perspective view of a turbine engine system coupled to a propeller for a personal watercraft, in accordance with some embodiments.
Figure 23:
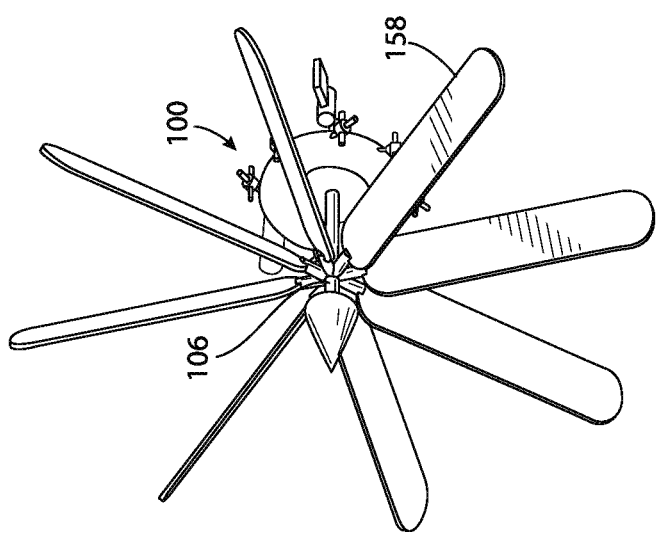
FIG. 23 shows the turbine engine system coupled to a propeller, in accordance with some embodiments.

FIG. 23 shows the turbine engine system 100 coupled to a propeller 158, in accordance with some embodiments. The shaft 106 of the turbine engine system 100 may directly couple to the propeller 158 without a gear change. When the propeller 158 is part of an aircraft, the turbine engine system 100 can be programmed to a desired rotational speed for take-off. In another embodiment, the propeller 158 may be part of a ship. The turbine engine system 100 can be customized by sizing the system per the application. For example, the 8-blade turbine may be implemented in some designs, but for more desired power, a 12-blade turbine, 16-blade turbine, 20-blade turbine, or larger can be implemented. In another embodiment, the propeller 158 may be part of a personal watercraft. FIG. 24 is a perspective view of a turbine engine system 100 coupled to a propeller 158 for a personal watercraft, in accordance with some embodiments. In this embodiment, the turbine engine system 100 is coupled to the propeller 158 by a gearbox 160 for a 90° angle gear transformation. A tiller 162 is shown for steering.

Figure 25:
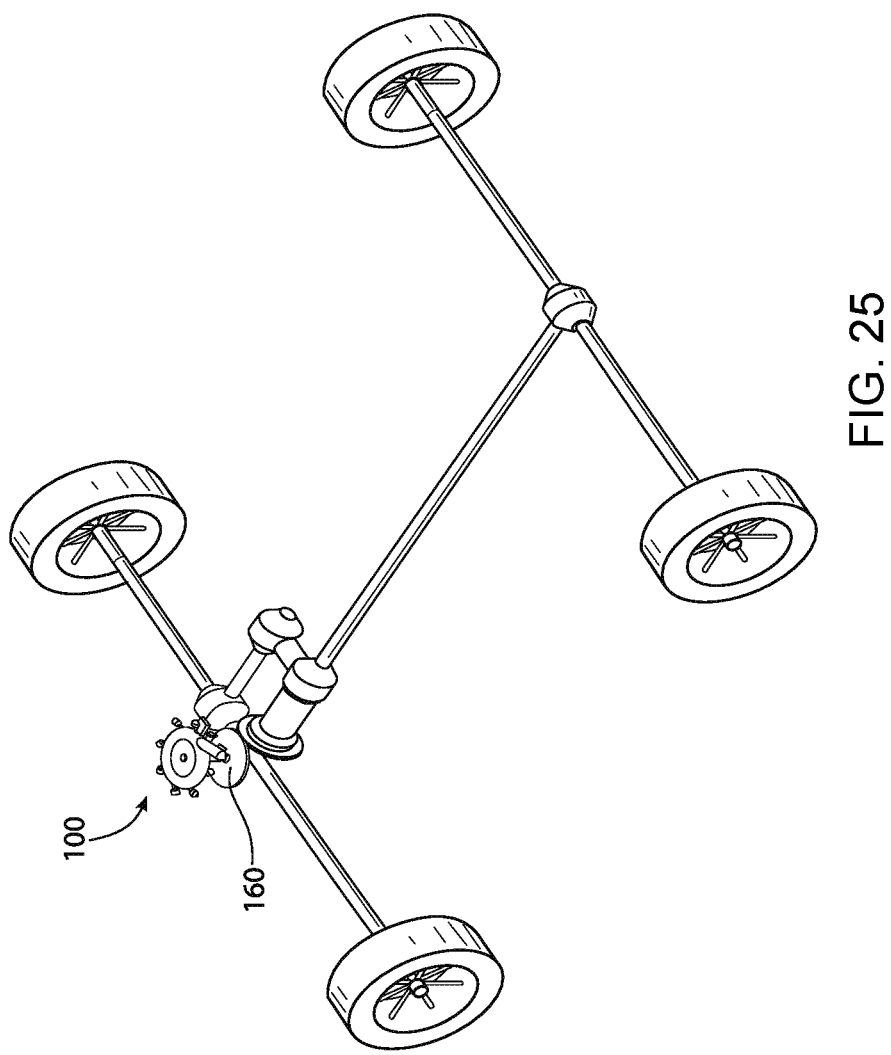
FIG. 25 depicts the turbine engine system mounted in a passenger vehicle, in accordance with some embodiments.

A typical passenger vehicle engine may have dimensions of 33 inches×22 inches×30 inches, weigh 164 kg and produce 245 horsepower. This can be replaced with the turbine engine system 100 having a small size and less weight. For example, the turbine engine system 100 including other components such as the air compressor 138 and fuel pump 140 may have dimensions of 16 inches×20 inches×16 inches, weigh 30-55 kg and produce 300 horsepower. FIG. 25 depicts the turbine engine system 100 mounted in a passenger vehicle, in accordance with some embodiments. The size and weight savings of the turbine engine system 100 can benefit component packaging and fuel economy. The turbine engine system 100 may be coupled to the transmission system by the gearbox 160 for a 90° angle gear transformation. In another embodiment, the turbine engine system 100 may replace the traditional engine in a semi-trailer truck.

Figure 27:
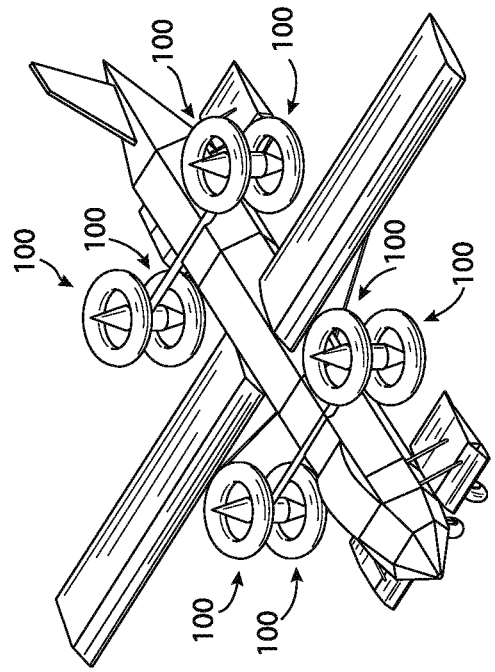
FIG. 27 shows a plurality of turbine engine systems in a vertical take-off and landing aircraft, in accordance with some embodiments.
Figure 26:
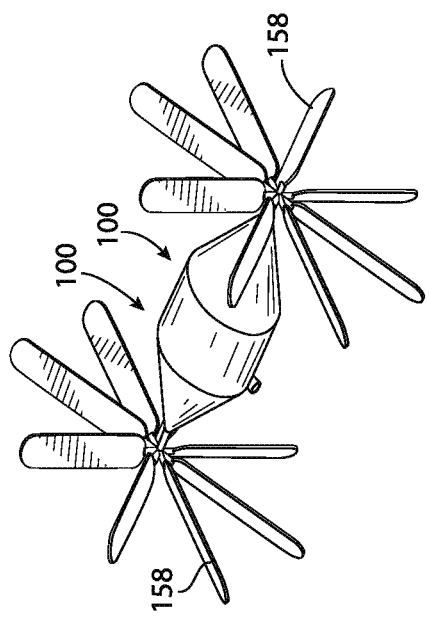
FIG. 26 shows two turbine engine systems with counter-rotating propellers, in accordance with some embodiments.

To generate more thrust for an airplane, two independent turbine engine systems 100 may be implemented. FIG. 26 shows two turbine engine systems 100 with counter-rotating propellers 158, in accordance with some embodiments. For example, two independent turbine engine systems 100 may be coupled together with counter-rotating propellers 158. In this way, more thrust may be generated with no losses due to gear friction. FIG. 27 shows a plurality of turbine engine systems in a vertical take-off and landing aircraft, in accordance with some embodiments. Each turbine engine system 100 can rotate on a first axis of the aircraft in a range between a 0° horizontal position to a 90° vertical position. This enables a high amount of maneuverability of the aircraft in roll, yoke and yaw directions while enabling vertical take-off and landing. This is disclosed in Jeng, U.S. Provisional Patent Application No. 62/976,829, entitled "Aircraft," and is hereby incorporated by reference.

In some embodiments, the turbine engine system 100 may be used for a submarine. For a typical submarine, the submarine stays submerged depending on the life of the battery. Once the battery runs out of charge, the submarine must emerge for air to run the diesel engine and charge the battery. The turbine engine system 100 may be implemented to generate power for the submarine by using an air independent propulsion system. For example, the turbine engine system 100 may use hydrogen peroxide as the oxidizer instead of fresh air which is similar to a liquid-fuel rocket. By using hydrogen peroxide, no external air is needed because the electricity generated on the submarine can be used to generate oxygen and electricity for the submarine crews enabling the submarine to stay underwater for up to a few weeks. The turbine engine system 100 can direct drive the submarine propeller for sailing underwater.

The turbine engine system 100 can be used to generate electricity for the home. For example, the turbine engine system 100 may be coupled to the axial flux motor 152, a battery, an inverter and a panel. The battery may be used as a backup while the inverter converts the 12/24/48 V DC battery to 120 V, 60 hz AC electricity. The inverter can directly connect to the circuit breaker/distribution panel to supply the electricity to the household. Artificial intelligence may be used to control the system. This implementation can save the consumer money on electric bills without service interruption from natural disasters or the need for a gas line and electric line. In some embodiments, the liquified natural gas supplied to the home can be used as the fuel in the turbine engine system 100.

In some embodiments, the turbine engine system 100 can be used as a portable generator. A typical portable generator may have dimensions of 119 inches×40 inches×83 inches, weigh 1500 kg and produce 100 kW. This can be replaced with the turbine engine system 100 coupled to, for example, the axial flux motor 152. For example, the turbine engine system 100 may have dimensions of 20 inches×20 inches× 20 inches, weigh 50-75 kg and produce 240 kW.

Figure 29:
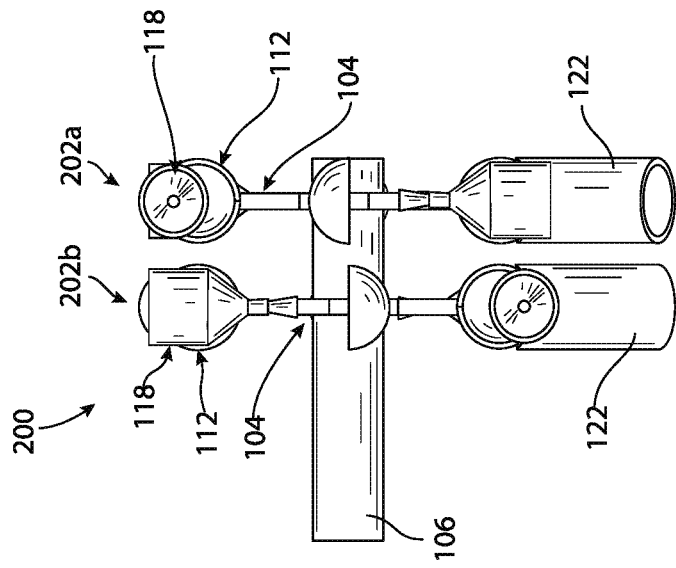
FIG. 29 is a side view of the reversible turbine engine system, in accordance with some embodiments.
Figure 28:
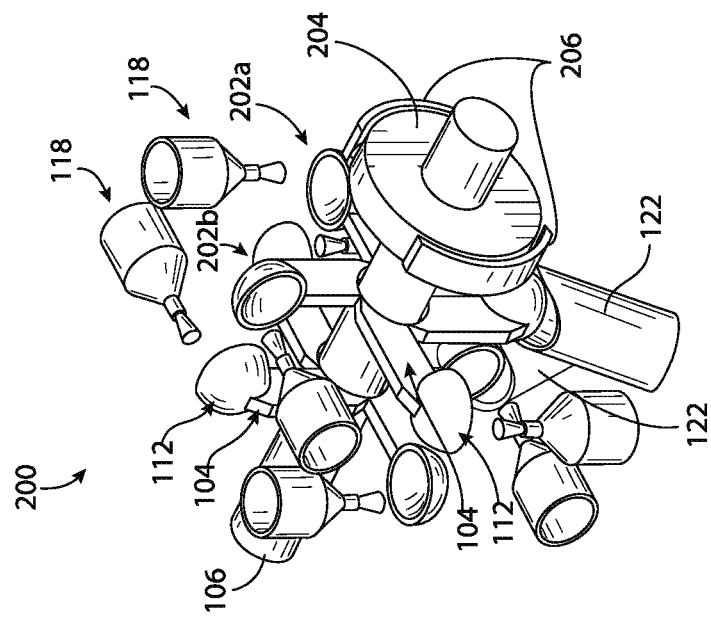
FIG. 28 is a perspective view of a reversible turbine engine system, in accordance with some embodiments.
Figure 30:
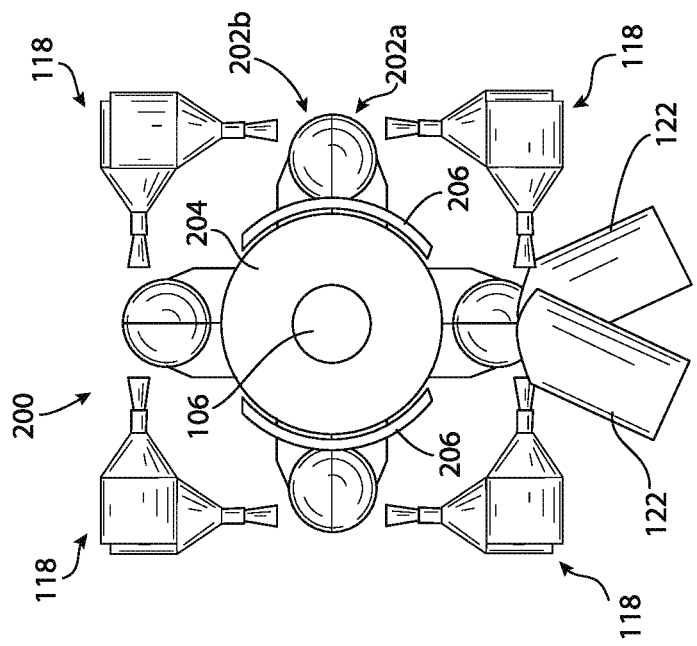
FIG. 30 is a front view of the reversible turbine engine system, in accordance with some embodiments.

The turbine engine system 100 can be designed for enabling a passenger vehicle to travel in the reverse direction such as for backing up and parking maneuvers, and further, with braking capability. FIG. 28 is a perspective view of a reversible turbine engine system 200, in accordance with some embodiments, FIG. 29 is a side view of the reversible turbine engine system 200, in accordance with some embodiments, and FIG. 30 is a front view of the reversible turbine engine system 200, in accordance with some embodiments. In FIGS. 28-30, the housings 120 of the reversible turbine engine system 200 are not shown for simplicity. The housings 120 are similar to the housings 120 as shown in at least FIGS. 1, 5 and 7. Two turbines, 202a and 202b, are coupled to the shaft 106 in opposing directions meaning turbine 202a is positioned on the shaft 106 at 180° to turbine 202b. In this way, the open surface of each of the plurality of blades 112 of turbine 202a are opposing the open surface of each of the plurality of blades 112 of turbine 202b when rotating relative to the shaft 106. The turbines 202a and 202b each include the plurality of spokes 104, the plurality of blades 112 and the plurality of dispensers 118 with embodiments as described herein. In this configuration, turbine 202a may rotate in a first direction such as counter-clockwise while turbine 202b may rotate in a second direction such as clockwise. Turbine 202a may rotate in a same direction or a different direction than turbine 202b relative to the shaft 106.

Referring to FIGS. 28 and 30, a flywheel 204 is coupled to the shaft 106 and configured to rotate relative to the shaft 106. The flywheel 204 includes a plurality of brake shoes 206 which are configured to contact the flywheel 204 to prevent the flywheel 204 from rotating. In this way, when the flywheel 204 is rotating and the plurality of brake shoes 206 are activated, the plurality of brake shoes 206 contact against the flywheel 204 and slow the vehicle to enable braking capabilities. The flywheel 204 and the plurality of brake shoes 206 may be in communication with the controller 134 so that the controller 134 facilitates the operation.

Figure 31:
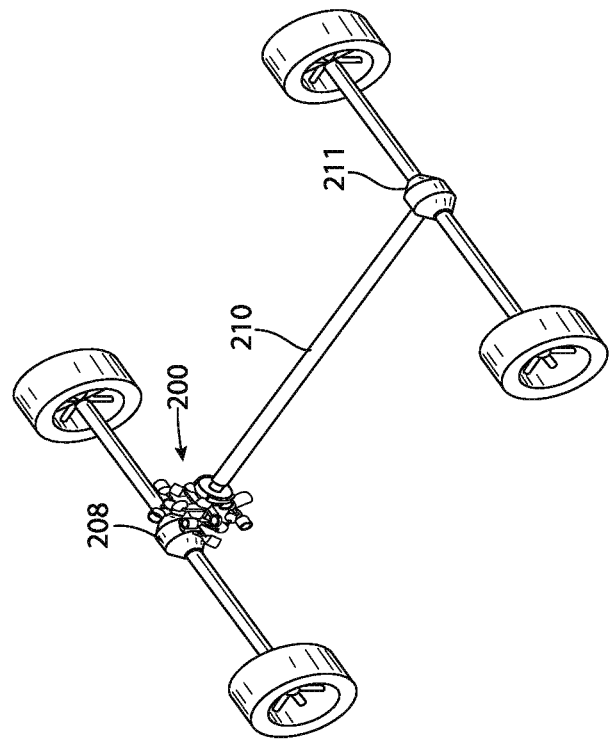
FIG. 31 shows the reversible turbine engine system mounted in passenger vehicle, in accordance with some embodiments.

The reversible turbine engine system 200 may be mounted in a passenger vehicle as shown in FIG. 31. The reversible turbine engine system 200 in a passenger vehicle replaces the conventional engine and transmission (gearbox), and may be sized to meet speed and torque requirements per application. The thermal efficiency of the reversible turbine engine system 200 may be 50-85% in contrast to the conventional piston engine with a thermal efficiency of about 35%. The reversible turbine engine system 200 may be suitable for use in a two-wheel drive vehicle or a four-wheel drive vehicle. For example, in a front two-wheel drive vehicle or four-wheel drive vehicle, the reversible turbine engine system 200 may be located near the front differential 208 and coupled to a prop-shaft 210. In a rear two-wheel drive vehicle, the reversible turbine engine system 200 may be located near the rear differential 211.

Figure 32:
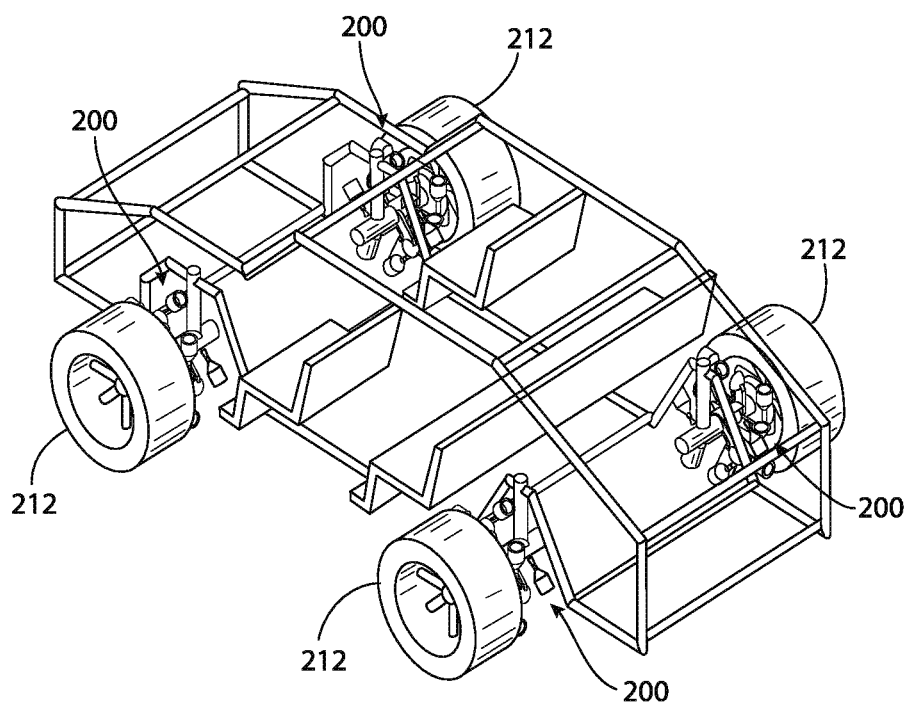
FIG. 32 shows the reversible turbine engine system mounted in a passenger vehicle near a wheel, in accordance with some embodiments.

In another embodiment, the reversible turbine engine system 200 may be implemented in a passenger vehicle and mounted near a wheel 212. FIG. 32 shows the reversible turbine engine system 200 mounted in a passenger vehicle near a wheel 212. For example, there may be a reversible turbine engine system 200 mounted at each wheel 212 for a four-wheel drive vehicle, or there may be a reversible turbine engine system 200 mounted at each front wheel 212 for a front two-wheel drive vehicle, or there may be a reversible turbine engine system 200 mounted at each rear wheel 212 for a rear two-wheel drive vehicle. In these scenarios, the conventional engine and most drivetrain components are eliminated.

Similarly, the turbine engine system 100 and the reversible turbine engine system 200 may be substituted for or replace the motor on other types of motorized devices such as motorcycles, lawnmowers, snow blowers, snow throwers, electric bicycles, scooters, personal watercrafts such as wave runners and jet skis, farm machinery, etc.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A system comprising:
  a turbine having a plurality of blades being spaced circumferentially around a shaft, each blade of the plurality of blades being a hemispherical-shaped cup with an open surface;
  a plurality of dispensers, each dispenser of the plurality of dispensers positioned facing the open surface of the plurality of blades, and directing discharged fluid toward the open surface of the plurality of blades to drive the turbine;
  wherein the each dispenser comprises:
    a combustion chamber having a funnel shape with a top surface and a bottom surface, the top surface being at least four times wider than the bottom surface;
    an air intake valve coupled to the combustion chamber the air intake valve having a first closed position and a second open position, and allowing air into the combustion chamber from an air compressor directly coupled to the combustion chamber;

a fuel injector coupled to the combustion chamber, and injecting fuel into the combustion chamber from a fuel system;

an ignitor coupled to the combustion chamber, and supplying a spark for combustion of an air-fuel mixture in the combustion chamber, the ignitor directly opposite the fuel injector; and a nozzle having a first nozzle end coupled to the bottom surface of the combustion chamber and a second nozzle end positioned to direct the discharged fluid after combustion in the combustion chamber toward the open surface of the plurality of blades driving the turbine;

a housing enclosing the plurality of blades and a portion of each dispenser of the plurality of dispensers;

a plurality of exhaust pipes coupled to the housing and extending away from the shaft directing the discharged fluid out of the housing, wherein each exhaust pipe of the plurality of exhaust pipes corresponds to a respective dispenser of the plurality of dispensers; and a controller in communication with the plurality of dispensers, and configured to control the plurality of dispensers.

2. The system of claim 1, wherein:

the air intake valve comprises a flap, a spring between the flap and the top surface of the combustion chamber, and a screw, the screw being adjustable to control an opening angle of the flap relative to the top surface of the combustion chamber in the second open position; and the flap is forced to the first closed position by an explosion of the air-fuel mixture and the spark in the combustion chamber.

3. The system of claim 1, further comprising a cooling system having liquid coolant conduits inside of the housing and coupled to a radiator being outside of the housing, the cooling system configured to dissipate heat of the discharged fluid.

4. The system of claim 1, wherein the exhaust pipe of the plurality of exhaust pipes: is curved and comprises a S-shape, S-bend, or serpentine shape;

is located along a circumference of the housing; and is positioned adjacent to the dispenser of the plurality of dispensers and between two dispensers of the plurality of dispensers.

5. The system of claim 1, wherein the plurality of dispensers and the plurality of exhaust pipes are equally spaced circumferentially around the housing.

6. The system of claim 1, further comprising a catalytic converter coupled to the plurality of exhaust pipes.

7. The system of claim 1, wherein the shaft is coupled to a motor, generator, wheel, propeller or transmission system.

8. The system of claim 1, further comprising:

a second system coupled to the shaft;

wherein the turbine and a second turbine of the second system rotate relative to the shaft;

wherein the turbine and the second turbine rotate in a same direction relative to the shaft;

or wherein the turbine and the second turbine rotate in opposite directions to one another relative to the shaft.

9. The system of claim 1, wherein a plurality of systems is coaxially coupled to the shaft.

* * * * *